United States Patent
Sandholm

(10) Patent No.: US 9,396,275 B2
(45) Date of Patent: Jul. 19, 2016

(54) GEOGRAPHICALLY PARTITIONED ONLINE SEARCH SYSTEM

(75) Inventor: Thomas E. Sandholm, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 987 days.

(21) Appl. No.: 13/233,992

(22) Filed: Sep. 15, 2011

(65) Prior Publication Data

US 2013/0073581 A1    Mar. 21, 2013

(51) Int. Cl.
G06F 7/00      (2006.01)
G06F 17/30     (2006.01)

(52) U.S. Cl.
CPC ...... *G06F 17/3087* (2013.01); *G06F 17/30545* (2013.01)

(58) Field of Classification Search
CPC ............. G06F 17/3087; G06F 17/30545
See application file for complete search history.

(56) References Cited

U.S. PATENT DOCUMENTS

| | | | |
|---|---|---|---|
| 7,058,631 B1 * | 6/2006 | Pal | |
| 7,321,919 B2 | 1/2008 | Jacobs et al. | |
| 7,594,011 B2 * | 9/2009 | Chandra | 709/224 |
| 7,881,984 B2 | 2/2011 | Kane, Jr. et al. | |
| 7,882,102 B2 | 2/2011 | Vechersky | |
| 8,712,841 B1 * | 4/2014 | Rajagopalan et al. | 705/14.16 |
| 2003/0081974 A1 * | 5/2003 | Grohs | 400/76 |
| 2004/0137855 A1 * | 7/2004 | Wiley et al. | 455/88 |
| 2006/0218114 A1 | 9/2006 | Weare et al. | |
| 2006/0266830 A1 | 11/2006 | Horozov et al. | |
| 2007/0143318 A1 | 6/2007 | Hendrey et al. | |
| 2008/0162343 A1 * | 7/2008 | Bedier | 705/44 |
| 2009/0100018 A1 | 4/2009 | Roberts | |
| 2010/0042611 A1 | 2/2010 | Cruzada | |
| 2010/0076951 A1 | 3/2010 | Lyle et al. | |
| 2010/0076968 A1 | 3/2010 | Boyns et al. | |
| 2010/0280920 A1 | 11/2010 | Scott et al. | |
| 2010/0332324 A1 | 12/2010 | Khosravy et al. | |
| 2011/0002009 A1 | 1/2011 | Ohashi | |

(Continued)

FOREIGN PATENT DOCUMENTS

| | | |
|---|---|---|
| JP | 2005284938 | 10/2005 |
| JP | 2005327020 | 11/2005 |

(Continued)

OTHER PUBLICATIONS

Ratnasamy et al, "GHT: A Geographic Hash Table for Data-Centric Storage," published on Sep. 2002 by UCLA.edu.*

(Continued)

*Primary Examiner* — Usmaan Saeed
*Assistant Examiner* — Paul Kim
(74) *Attorney, Agent, or Firm* — Brooks, Cameron & Huebsch, PLLC

(57) ABSTRACT

In one example, a memory includes a data structure organized to include information resident in a number of databases geographically-partitioned according to a number of shards. The data structure includes a geographically-hashed look up table containing a number of geo-hash ranges associated with the shards and is organized to enable instructions to execute and access the ranges according to a number of characters in a generated geo-hash value. The data structure also includes a plurality of user data object tables that contain respective user data attributes and link to a particular server node and an associated geo-partitioned database.

9 Claims, 15 Drawing Sheets

(56) References Cited

U.S. PATENT DOCUMENTS

2011/0119217 A1   5/2011   Moon et al.
2011/0137818 A1   6/2011   Goad et al.

FOREIGN PATENT DOCUMENTS

| | | |
|---|---|---|
| JP | 2006178743 | 7/2006 |
| JP | 2009146063 | 7/2009 |
| WO | WO2011019338 | 2/2011 |

OTHER PUBLICATIONS

Yingchen, et al., "An Ontology-based Approach for Mobile Personalized Recommendation", 2009 IITA International Conference on Services Science, Management and Engineering, Computer Science and Technology Department, East China Normal University, Shang Hai, China, Published: Jul. 11-12, 2009, pp. 336-339.

Sandholm, et al, "Global Budgets for Local Recommendations", Social Computing Lab, HP Labs, Palo Alto, CA 94304, USA, RecSys2010, Sep. 26-30, 2010, Barcelona, Spain, 8 pages.

Sandholm, et al, "Real-time, Location-aware Collaborative Filtering of Web Content", HP Labs, Social Computing Group, CaRR 2011, Feb. 13, 2011, Stanford, CA, USA, 5 pages.

Deshpande, et al., "Item-Based Top-N Recommendation Algorithms", University of Minnesota, ACM Transactions on Information Systems, vol. 22, No. 1, Jan. 2004, pp. 143-177.

Bennett, et al., "The Netflix Prize", KDDCup'07, Aug. 12, 2007, San Jose, CA, USA, pp. 3-6.

Unknown., "HTTP JSON Rest API Reference", Site: Glee Developer Wiki at http://wiki.hpgloe.com, Source Page: HTTP JSON Rest API Reference at http://wiki.hpgloe.com/restreference, Published: Jan. 5, 2011, Revised: Feb. 4, 2011, 5 pages.

Unknown., "How do I add content to Gloe?", Retrieved on Jul. 21, 2011 from http://wiki.hpgloe.com/noteapi, 2 pages.

Unknown., "Gloe Developer Wiki", Retrieved on Jul. 21, 2011 from http://wiki.hpgloe.com/, 1 page.

Unknown., "Glue API Documentation", Published: Jul. 5, 2010, 7 pages.

Unknown., "HP Glee API v1", Published: Dec. 5, 2009, 4 pages.

* cited by examiner

GEOGRAPHICALLY PARTITIONED ONLINE SEARCH SYSTEM

BACKGROUND

More and more content is generated and published by users online. As GPS sensors and unlimited data plans have been introduced for mobile devices, location based services have flourished. Many of these services are targeted for specific content domains and use-cases, and thus end up rewriting the location indexing and retrieval.

DETAILED DESCRIPTION

A memory is provided that includes a data structure organized to include information resident in a number of databases geographically-partitioned according to a number of shards to facilitate online search queries. The data structure includes a geographically-hashed look up table containing a number of geo-hash ranges associated with the shards. The look up table is organized to enable instructions to execute and access the ranges according to a number of characters in a generated geo-hash value. The data structure can be further organized to enable instructions to execute to link a client network node to a particular server node and an associated geo-partitioned database containing the geo-hash ranges in a shard data object table. The data structure also includes a plurality of user data object tables that contain respective user data attributes.

In some examples, described herein, a relational database management system (RDBMS) and one or more application clients may be provided to provide a feature rich social location-based service through an open API. In an example, the system scales out based on geographic partitioning. Furthermore, some implementations may not rely on geospatial key-value stores but rather use the capabilities of a full RDBMS. Consequently, more sophisticated queries may be supported efficiently locally.

Because of this design, the shard data object tables may also be de-normalized and accommodate RDBMS expressive SQL queries. However, in some implementations, instead of joins being performed, a mechanism akin to GROUP_CONCAT in MySQL (grouping columns instead of joining columns from multiple tables) is performed. The table queries may also perform radius boxing to avoid calculating the exact distance using Haversine arithmetic for more than the items that are in range.

In an example, if a query is touching more than one shard in its radius scope a SQL union of the shard results will be used in the stored procedure layer of the database or in the application server if the shards are located in different database servers.

Figure 1A:
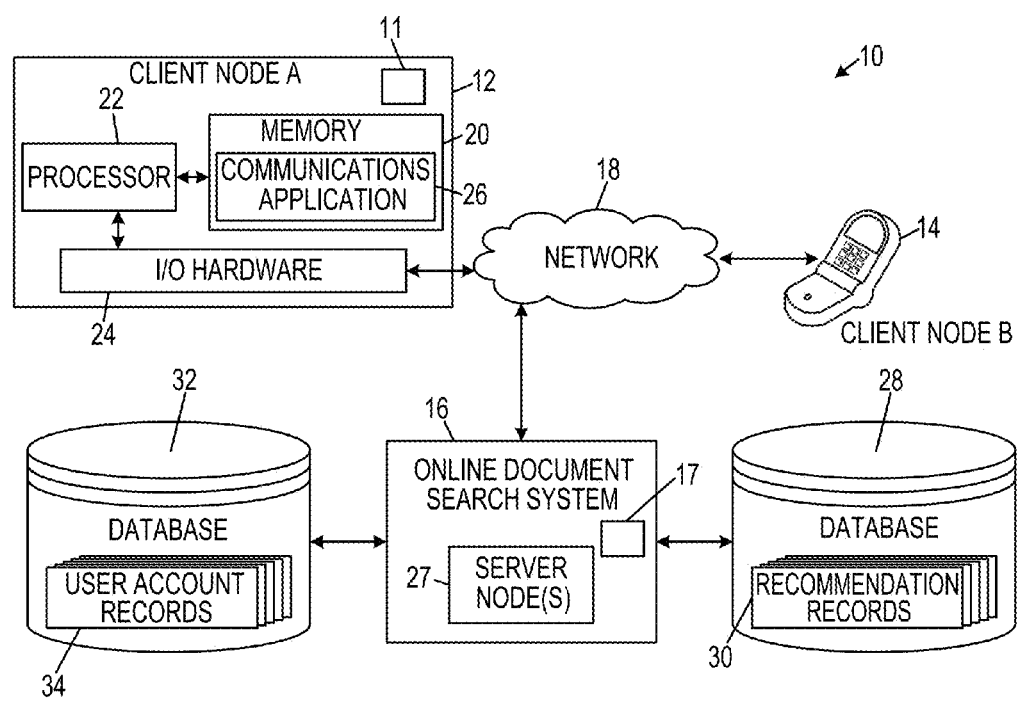
FIG. 1A is a diagrammatic view of an example of a network communication environment that includes a first client network node, a second client network node, and an online search system.

FIG. 1A is a diagrammatic view of an example of a network communication environment that includes a first client network node, a second client network node, and an online search system. FIG. 1A shows an example network communications environment 10 that includes a first client network node 12 (Client Node A), a second client network node 14 (Client Network Node B), and a search system 16 such as an online document (e.g., web page) or mobile print location (MPL) search system that are interconnected by a network 18. One example of such a search system 16 includes the recommender system service offered by the Hewlett-Packard Company. The first client network node 12 includes a computer-readable memory 20, a processor 22, and input/output (I/O) hardware 24 (including a display). The processor 22 executes at least one communications application 26 that is stored in the memory 20. The second client network node 14 may be configured in substantially the same way as the first client network node 12.

The communications applications 26 operating on the first and second client network nodes 12, 14 communicate with the online search system 16. The communications application 26 typically operates on a client network node that includes software and hardware resources which, together with administrative policies, user preferences, and other settings, define a local configuration that influences the administration of connections with other network nodes. The communications applications 26 also provide respective interfaces for receiving commands from the communicants. In addition, the communication applications handle the submission of recommendations from the client network nodes 12, 14 to the online search system 16 and the presentation of search results from the online search system 16 to the client network nodes 12, 14. In some examples, the communication applications 26 are implemented by web browser applications that respectively include extensions or plugins that handle communications with the online search system 16.

As shown in FIG. 1A, multiple different mobile platforms (e.g., client node A 12 and client node B 14) can be provided with a respective client side API 11 capable of providing a web enabled (e.g., hypertext transfer protocol (HTTP) GET) function call to the online search system 16. The web enabled function call to the online search system 16 is received by a respective MPL search system 16 side API 17. The online search system API can be implemented as a JSON representational state transfer (REST) API.

The online search system 16 can include one or more server nodes 27 that provide network infrastructure services that cooperate with the communications applications 26 in the process of establishing and administering network connections with the client nodes 12, 14.

The online search system 16 maintains a database 28 that contains records 30 of geo-tagged MPL recommendations for, for example; online documents or MPLs that were received from the client network nodes 12, 14. Each recommendation record 30 describes an association between a respective online document or MPL identifier that identifies a respective online document or MPL, recommendation information (e.g., an amount of credit allocated to the online document or MPL), and a geographic location identifier that identifies a respective geographic location. Each recommendation record 30 also optionally may include (i) a respective user identifier that identifies a user of the respective client network node that sent a submission from which the recommendation was derived, (ii) a respective channel identifier that identifies a respective category that is assigned to the associated online document or MPL, and (iii) a reference to a related URL, which may be used to bring up recommendations/notes when that URL is opened in a browser application.

In some examples, the online search system 16 additionally maintains a second database 32 that contains records 34 of user accounts. The user account records 34 typically store contact information, an amount of recommendation credit that currently is available for submitting recommendations, and other information relating to the respective users of the client network nodes 12, 14.

The network 18 may include any of a local area network (LAN), a metropolitan area network (MAN), and a wide area network (WAN) (e.g., the Internet). The network 18 typically includes a number of different computing platforms and transport facilities that support the transmission of a wide variety of different media types (e.g., text, voice, audio, and video) between network nodes.

In some examples, the online search system 16 includes a back-end service that uses dynamic database sharding to partition the data efficiently for scalable geo-location (e.g., find nearby and rank) queries. Databases, (e.g., organized collections of records that are presented in a standardized format that can be searched by computers) described herein may be stored on a single computer-readable data storage medium on a single computer or they may be distributed across multiple computer-readable data storage media on one or more computers. Furthermore, such databases may be geographically partitioned ("geo-partitioned") according to different geographic location identifiers.

In some examples, the online search system 16 includes an application programming interface (API) is provided that can be used from a web enabled client (e.g., HTTP get mobile client) including a web browser to recommend and query content by location, users, and tags as well as to retrieve personalized recommendations. Such an API may be implemented as a set of routines, protocols, and tools (e.g., rules and specifications) that software programs can follow to communicate with one another. In one implementation, a lightweight extensible markup language (XML) and JSON remote interface is provided to be accessible from a wide range of devices and web browsers. This open platform may allow developers to create any number of complementary APIs for the different client mobile platforms.

That is, this open API may allow developers to mashup location aware discovery and sharing of content with numerable use cases. Herein, middleware may be provided to allow generic, real-time, geo-aware tasks including: popularity ranking of content, social filtering of content, channel/tag popularity ranking, local (channel-based) content expert discovery, folksonomy tagging of content, distance ranking of content, collaborative filtering of content, time-relevancy of content, advertisement and auctioning of content (including second price ad auctioning), prediction market arbitrage of content to forecast future events, live polling of content popularity, coverage-limited tagging of content, feeds of new content views, feeds of new content ratings, syndication of rating to social media platforms, third party single sign-on authentication, and/or real-time notifications of content updates.

A client side API 11 enables a web enabled mobile client to interface with the online search system API. As described herein, an online search system 16 (e.g., online document or MPL search system) API 17 is provided which communicates with a client network node among various different mobile platforms and receives, via the online API, a recommendation (rec) web enabled function call to recommend an online document or MPL from the client network node. The rec function call can include a geographic location identifier for the client network node and a selected online document or MPL as parameters. The API operates on the function call to pass the online document or MPL identifier as an attribute to the online search system.

According to one or more examples, an online document or MPL API may be provided to receive another (second type) rec web enabled function call from the client network node to submit a comment in association with a given online document or MPL. This rec function call may include the geographic identifier parameter. In addition, this rec function call may pass a note attribute with text and a reference attribute associated with the selected online document or MPL identifier to the online search system.

In one example of this second type rec web enabled function call, the same rec REST API operation is performed passing in a notes attribute with the text of the attribute instead of a URL attribute. To associate the note with an online document or MPL, a reference (ref) attribute to associate to the note is passed in with the URL. This type of note may also be associated with the creator/initial recommender of the item, exposing the creator more prominently than with the first type rec web function call. The creation time likewise also may be exposed when following the URL that is created from the note (and returned with the API). This example can include notes of 300-4000 characters. A comment using regular notes will store a notes entry that can be retrieved when following the notes URL.

Another example of this second type of rec web function call includes a more lightweight note referred to as a page note (PNote) that may not require any state lookup on the online search system 16 server nodes 27, and that may allow more control of the format of the URL created. This type of note is self-contained in the URL. This note type can include notes that are less than 100 characters where a URL allows up to 300 characters. Following the URL will show a web page similar to the regular notes web page, but all the information displayed is available in the URL. This feature may be used to create a very large number of items to recommend with a small amount of text for each item. This model may be used in polling applications where users can create their own geo-tagged, ad-hoc polls.

To create the PNote the following URL structure may be used: http://www.recommendersystem.com/json/pnot/?q=<PNote><PNote>:=<Title>,<Content>, Where <Title> denotes the title of the note, and <Content> may be an arbitrary text string. XML, HTML or JavaScript may not be used in either the content or the title. The <PNote> part is URL encoded as it is passed and an HTTP GET parameter. This URL may be recommended and tagged into any arbitrary geolocation and follows all the rules for regular URLs in the search system 16. That is, this URL is entered in the system with an API call to the rec operation and retrieved with an API call to the getrec operation. At that point the geolocation and tag/channel associations are made.

Another example of this second type of rec web function call is referred to herein as Quick Notes (QNote). The QNote is similar to PNotes in that they are self-contained. QNotes, however, contain a little more structure. The main idea behind the QNote is to fix or pin the location associated with the note as opposed to leaving it up to end users to decide what location the note should be associated with. This feature may be used in the online search system 16 to integrate with point of interest (POI) databases that contain very little more than the venue name and address. The venues are fixed in a location and hence can reliably provide point-to-point direction with the location encoded in a QNote.

To create the QNote the following URL structure may be used: http://www.recommendersystem.com/json/pnot/?q=<QNote><QNote>:=<Latitude><Longitude><Site><PNote><PNote>:=<Title>,<Content>. The <Site> part is by some clients used to pick up a logo to display but may be an arbitrary URL. The <PNote> part follows the same rules as described above for PNotes.

This URL may be recommended and tagged following all the rules for regular URLs in the search system 16. That is, this URL is entered into the system with an API call to the rec operation and retrieved with an API call to the getrec operation. At that point the tag/channel association is made.

In an example of a request for an online document or MPL recommendation, the online document or MPL identifier is a URL and the online document or MPL API received a get recommendation (getrec) web enabled function call from the client network node to get online document or MPL recommendation information. The getrec function call includes a geographic location identifier as a parameter for the client network node. Further, the online document or MPL API responds to the getrec function call by returning, via the online document or MPL API, real time ranked recommendations for multiple online documents or MPLs in JSON format from an online document or MPL database in an online search system. The multiple online documents or MPLs are indexed online in the database according to URLs. For instance, an index model may be built in real time (e.g., indexing as information is received in band to a given computing platform) using databases that are partitioned in a predetermined manner (e.g., using geographically pre-partitioned databases). The online document or MPL API 17 can return object JSON attributes, in response to the getrec function call, having a JSON array of 10-tuple with elements output format.

The online document or MPL API can be implemented as a JSON representational state transfer (REST) API, and receiving the web enabled function calls can include receiving a http get function call to communicate with multiple HTTP GET enabled client network nodes from different mobile platforms.

In an example, instructions associated with the online document or MPL API can be executed to receive the note function call and can be executed create a URL comment identifier to be indexed online in association with the selected online document or MPL in the online search system. Further instructions associated with the API can be executed in response to the note function call to pass a note attribute with text and to encode the note attribute with text within the created URL comment identifier to be indexed.

The online document or MPL identifier can be a URL and instructions associated with the API can be executed to respond to the getrec function call by returning, via the API, real time note attributes with text in association with the selected online document or MPL in JSON format from an online database in the online search system. In various examples, instructions associated with the API can be executed to receive a rec function call that includes a recommending user identifier as a parameter for the client network node and a recommendation credit identifier (bid) as a parameter in association with a respective geographic location identifier parameter and online document or MPL identifier parameter. Further instructions associated with the API can be executed to pass the recommendation credit identifier as an attribute to the search system; and to decrement a budget (e.g., "submission credit") of a submitting user account associated with the recommending user identifier.

In parallel to exchanging (e.g., receiving and returning) function calls, the online search system 16 also may run data-mining and web crawling agents that automatically populate the database 28 with geo and URL data for specific channels in order to maintain a high overall quality even for long tail information items that might be requested by very few users or very rarely. In some examples, the online search system 16 may leverage attention economy, collaborative filtering, and information market research in order to improve the accuracy of the list of ranked online document or MPL identifiers that are sent to the client network nodes.

Figure 1B:
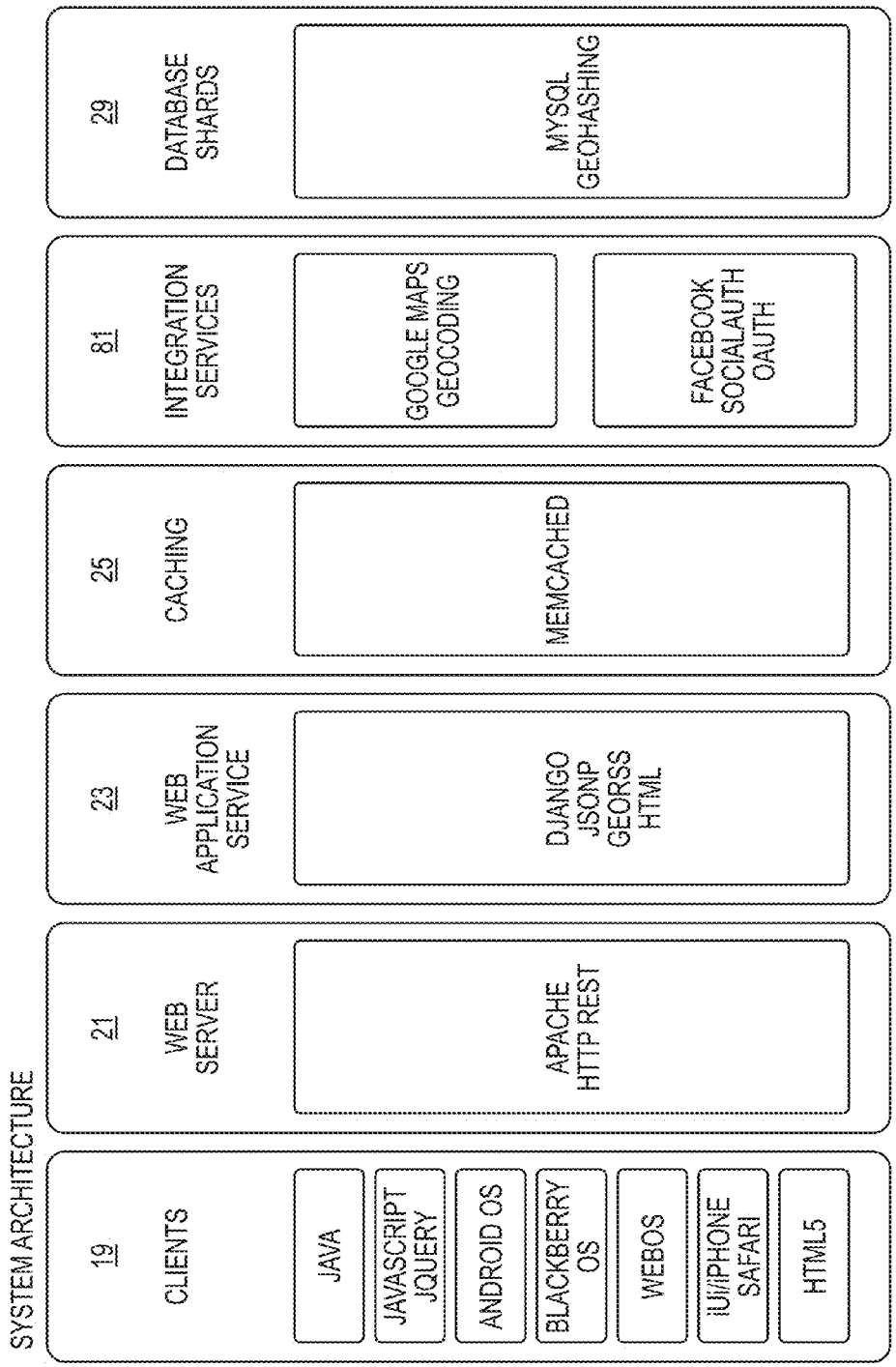
FIG. 1B illustrates an example of a system architecture of a platform for online content services according to the present disclosure.

FIG. 1B illustrates an example of an architecture of a platform for online content services according to the present disclosure. Such a platform for online content services may include a number of components that function together to provide online content services. For example, the platform can include client interfaces, web servers, web application services, caching, integration services, and/or databases, such as those described in more detail below with respect to FIG. 1B. A platform for online content services can include client interfaces 19 (e.g., provided via Java, JavaScript JQuery, Android operating system (OS), BlackBerry OS, Web OS, iUi/iPhone Safari, HTML5). While the client interfaces 19 typically run on the client device (e.g., as firmware or software stored in memory resources of the client and executed by the client's processor resources), such interfaces may generally be considered to be part of the platform when they operate in conjunction with other platform components to provide online content services.

The platform can include web servers 21 (e.g., Apache, HTTP representational state transfer (REST)) that can include processing and memory resources. Each web server 21 in the platform does not have to run the full platform stack. Rather, each web server 21 can be associated with a particular database 29 (e.g., a MySQL database) to provide an online content service for the content in that particular geo-partitioned (e.g., geo-hashed) database. The web servers 21 can provide the functionality associated with primitives, as described herein.

A primitive is a generic functionality provided by a platform for online content-specific services. A primitive can have multiple models that can be used with different online content and/or services without having to recreate the functionality of the generic primitive. Primitives can include, for example, an activity log of explicit and/or implicit use and/or recommendations of content, an economic voting primitive for recommending content, a hierarchical folksonomy of tags, an interface with a social network, and a geomodel to partition data for efficient local retrieval, among others.

One primitive includes an economic recommendation model that provides a temporal budget of recommendations that can be submitted by a user for ranking content. In some examples, the number of recommendations that a particular user may make within a time span is limited by the amount of credit that the user currently has available. Recommendation credits (or tickets) may be granted or purchased and used to increase prominence of an online document or MPL in connection with a geographic location. Recommendation credits can be provided to a user in a discrete amount per time period. For example, a user may receive 5 recommendation credits per week. Furthermore, a recommendation credit used by a user (e.g., when a user recommends content) can have a fixed duration after which it is no longer considered by the platform when providing results (e.g., the user-provided recommendation can expire). User-provided recommendations can be used by the platform to generate a result (e.g., suggestion) for an online document or MPL in response to a later query by a user.

Taking the economic recommendation primitive as an example of a primitive, the economic recommendation primitive can be used when building applications for recommending different types of online content, such as an MPL service and a restaurant location service, as will be described in more detail with respect to FIG. 1F). An economic recommendation model can include a temporal budget of recommendations that can be submitted by a user for recommending content. A temporal budget of recommendations implies that the recommendations are somehow limited in time (e.g., the user has a certain number of recommendations available per unit time and/or the recommendations have a certain lifespan or expiration).

Another example of a primitive is an activity log that stores implicit and/or explicit recommendations of geo-partitioned content by a plurality of users. An explicit recommendation is a recommendation, submitted by the user, of a particular item of the content. An implicit recommendation is a recommendation of a particular item of the content based on, for example, a viewing and/or using of the content by the user. As used herein, a recommendation of the content can imply a recommendation of content itself (e.g., a good and/or service) and/or a recommendation of a provider of the content. In some instances, it may not be possible to distinguish between the content and the provider.

The platform can include web application services 23 (e.g., via Django, JavaScript Object Notation with Padding (JSONP), GeoRSS, HTML). The web application services 23 can provide a search system side API, as described herein. An example of a web application service 23 is an online content service for an online document or MPL, as described herein.

The platform can include a caching system 25 (e.g., Memcached). The caching system 25 can be a general purpose distributed memory caching system used to speed up dynamic database-driven websites by caching data and objects in RAM to reduce the number of times an external data source (such as a database or API) is read.

The platform can include integration services 81 (e.g., for integration with Google Maps, Geocoding, Facebook Connect, SocialAuth, OAuth). Authentication can occur over an integration service 81 or with a native (to the platform) authentication protocol. For authentications using an integration service 81, a user can register to obtain a nickname and recommendation key. In some examples, anonymous users can also use the platform, however anonymous users may have stricter recommendation credit quotas. Integration services 81 can help provide personal content services for a user (e.g., by collaborative filtering of geo-partitioned content based at least in part on previous similar explicit and/or implicit recommendations submitted by other users). Integration services 81 can help provide social content services including social filtering of the geo-partitioned content based at least in part on previous explicit and/or implicit recommendations submitted by friends (e.g., "friend recommendations") of a user (e.g., where "friends" of the user are determined according to an interface between the platform and a social network such as Facebook). Integration services 81 can help provide time-aware and/or location-aware content services including time relevancy and distance ranking of the geo-partitioned content.

The platform can include databases 29 (e.g., MySQL databases, Geohashed databases). The databases 29 can be provided with dynamic database sharding, as described herein (e.g., where each geographic region has its own real or virtual database containing region-specific recommendation tables). Each database 29 can be on its own node, or multiple databases 29 can be located on a single node. In some examples, the region-specific recommendation tables can be partitioned across nodes. User-submitted recommendations can be confined to a geo-partitioned database associated with a respective item of the content being recommended.

The platform can host services that create and recommend social, personalized, time- and location-aware online content. The platform can scale to serve a large amount of geo-partitioned data to a large number of users. The platform can be designed around generic primitives that can be used to serve a wide array of content-specific services on the same infrastructure.

Figure 1C:
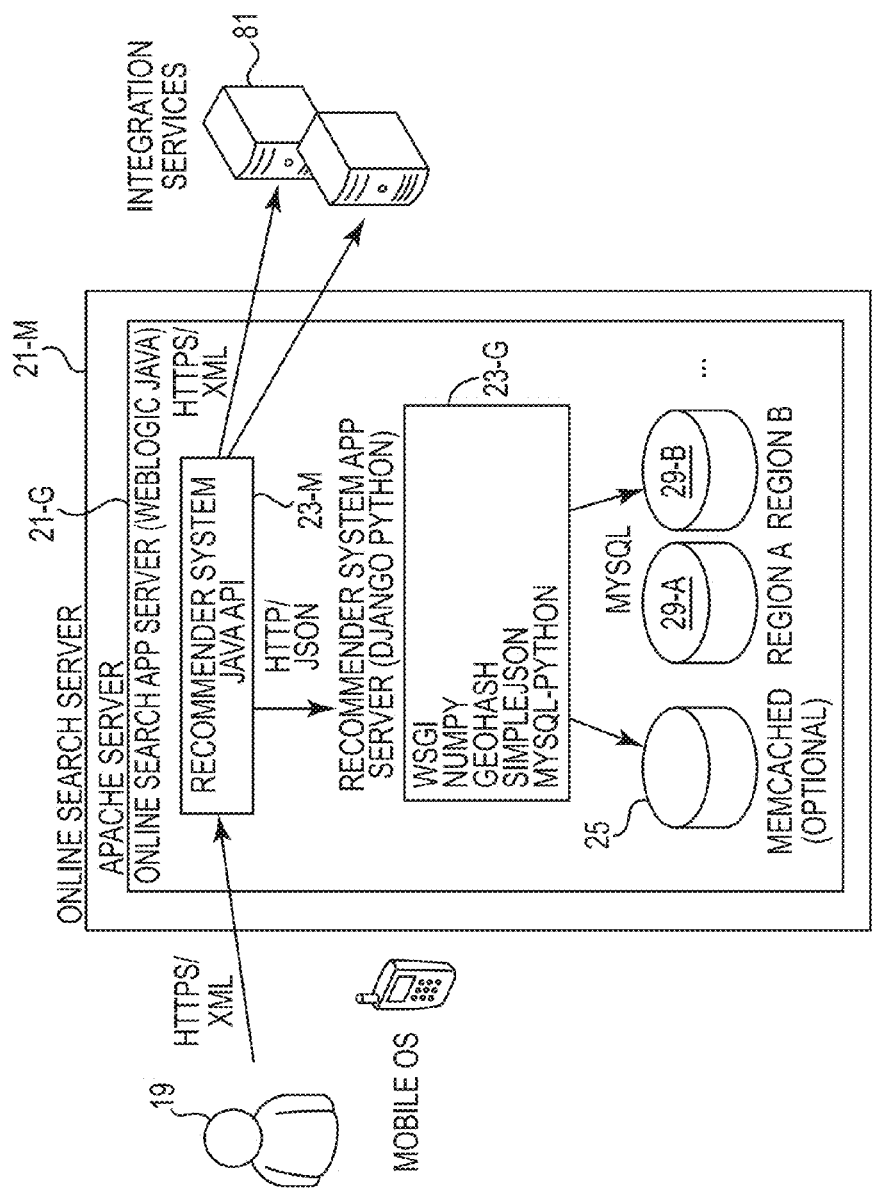
FIG. 1C illustrates an example implementation of a system architecture of a platform for online content services according to the present disclosure.

FIG. 1C illustrates an example implementation of a system architecture of a platform for online content services according to the present disclosure. The system architecture of the platform for online content services illustrated in FIG. 1C can be analogous to the system architecture illustrated in FIG. 1B. The platform can include client interfaces 19 (e.g., provided via a HTTP secure (HTTPS)/XML interface with a mobile OS of a client's mobile device).

The platform can include web servers 21 (e.g., an online document or MPL server 21-M hosting an Apache server 21-G) that can include processing and memory resources. In an example implementation, the Apache server 21-G can host an online document or MPL application server 23-M (e.g., providing a recommender system Java API via WebLogic Java, as described herein). The online document or MPL application server 23-M can communicate with integration services 81 via HTTPS/XML. The online document or MPL application server 23-M can communicate with a recommender system application server 23-G hosted by the Apache server 21-G via HTTP/JSON. The recommender system application server can be provided via a Django Python web framework that can include a web server gateway interface (WSGI), an extension to the Python language supporting large multidimensional arrays and matrices and accompanying mathematical functions (Numpy), a hierarchical spatial data structure that subdivides space into grid elements (Geohash), SimpleJSON, and/or MySQL-Python, among others.

The recommender system application server 23-G can interface with a caching system 25 (e.g., Memcached). The caching system 25 can be a general purpose distributed memory caching system used to speed up dynamic database-driven websites by caching data and objects in RAM to reduce the number of times an external data source (such as a database or API) is read. The recommender system application server 23-G can interface with databases (e.g., database 29-A and database 29-B). Database 29-A and database 29-B can represent different nodes of a geo-partitioned MySQL database.

Figure 1D:
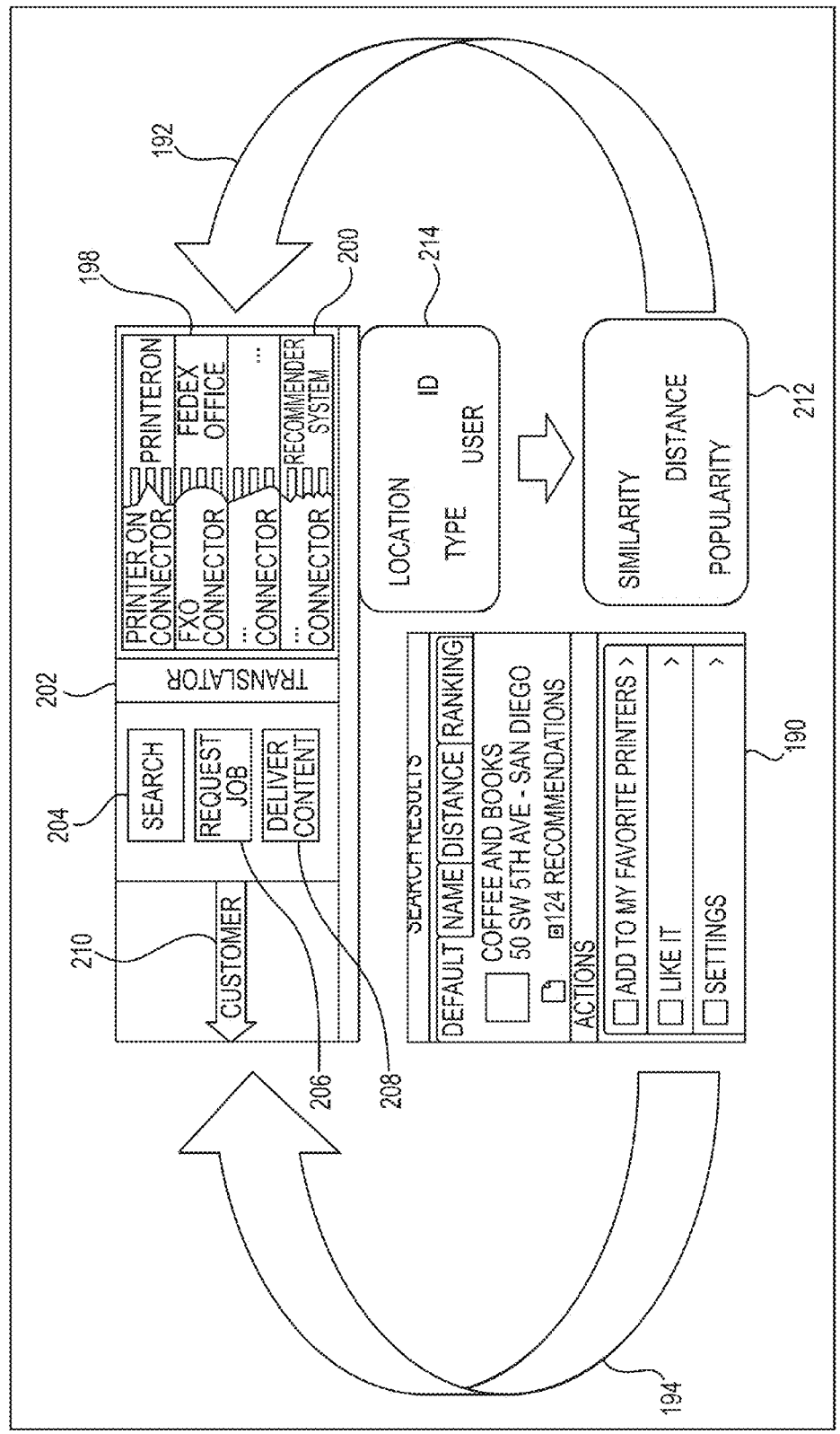
FIG. 1D is a block diagram of an example relationship between mobile print location (MPL) user operations and a recommender system according to the present disclosure.

FIG. 1D is a block diagram of an example relationship between online document and MPL user operations and a recommender system. A recommender system can work as a recommender engine, or system, with and/or within an online document or MPL system to recommend certain online documents or MPLs to users in search of an online document or MPL. Via an example user interface 190, a number of online document or MPL options can be displayed to a user. Also via user interface 190, choices including recommending a certain online document or MPL, using a certain online document or MPL, and/or adjusting personal settings regarding an online document or MPL system can be displayed to a user.

An online document or MPL system can work with connectors, and these connectors can be printing partners (e.g., FedEx Office 198) or auxiliary services, such as recommender system 200. A user, or customer 210, can search for online documents or MPLs 204, request print jobs 206, and provide the print job to the MPL and/or request to have an MPL deliver the print job or print content 208. These requests can be made via user interface 190, which may be presented on a mobile device, such as a smart phone. This is illustrated in FIG. 1D as arrow 194. Translator 202 can translate these customer requests into calls to the aforementioned connectors for locations and print jobs. As illustrated at 214, a customer may also be able to filter his or her print job request by previous personal preference (e.g., entering a user identifier), location of the MPL, and/or type of print job (e.g., color, high resolution, black and white, etc.).

The online search system, working together with the recommender system, can sort and return the results to the customer in a number of ways. As illustrated at 212, the results can be ordered by distance from the user, similarity of online documents or MPLs, and/or popularity of the online document or MPL. For example, a default result can be distance from the customer, but if the customer's location is not exactly known, the results may be displayed in a different order. The results can also be displayed in alphabetical order by the name of the online document or MPL. In some examples, a connector (e.g., FedEx Office 198) can privilege some of its results on the top of a result list according to some partner contract definition. Each search result can have an identifier, and these identifiers can be passed to the recommender system, as illustrated by arrow 192, which can annotate the search result with recommendation data (e.g., user recommendations of an online document or MPL). This annotation can allow for additional ordering criteria, where the most recommended online document or MPL is listed first.

Figure 1E:
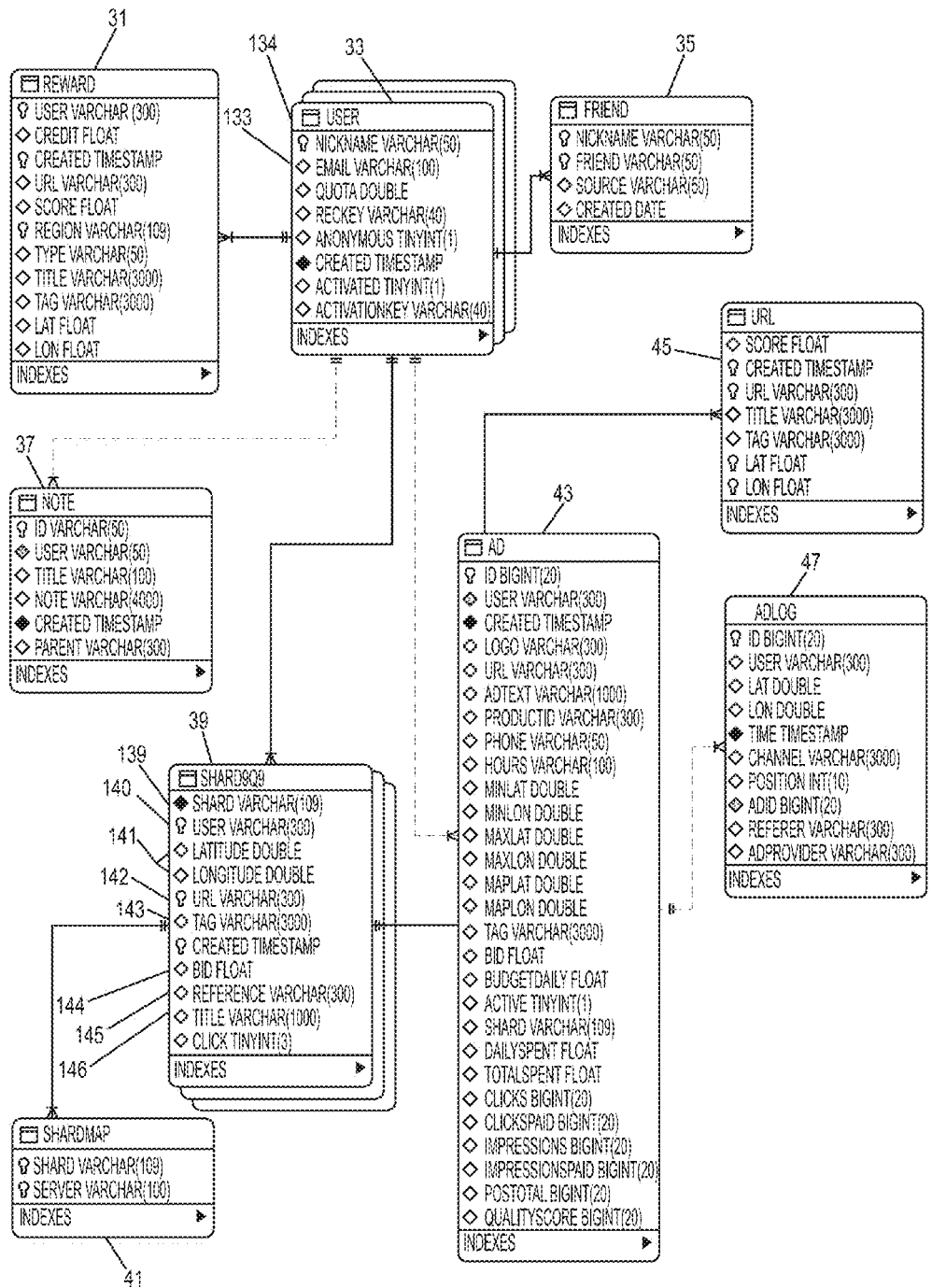
FIG. 1E illustrates a data structure within a memory storing data for access by an application program being executed in connection with an online search system according to the present disclosure.

FIG. 1E illustrates a data structure within a memory storing data for access by an application program being executed in connection with an online search system according to the present disclosure. Such a data structure may be stored in memory and can include information resident in one or more databases on a single computer or across a distributed computing environment. Furthermore, the data structure can include a plurality of attribute data objects containing different information from the one or more databases. As described above one example of an online search system, discussed herein, includes an online document or MPL search system 16. As discussed in connection with FIG. 3A, a server node 27, 60 to the online document or MPL search system 16 can include processor 62 and memory resources 64, 68.

Figure 3A:
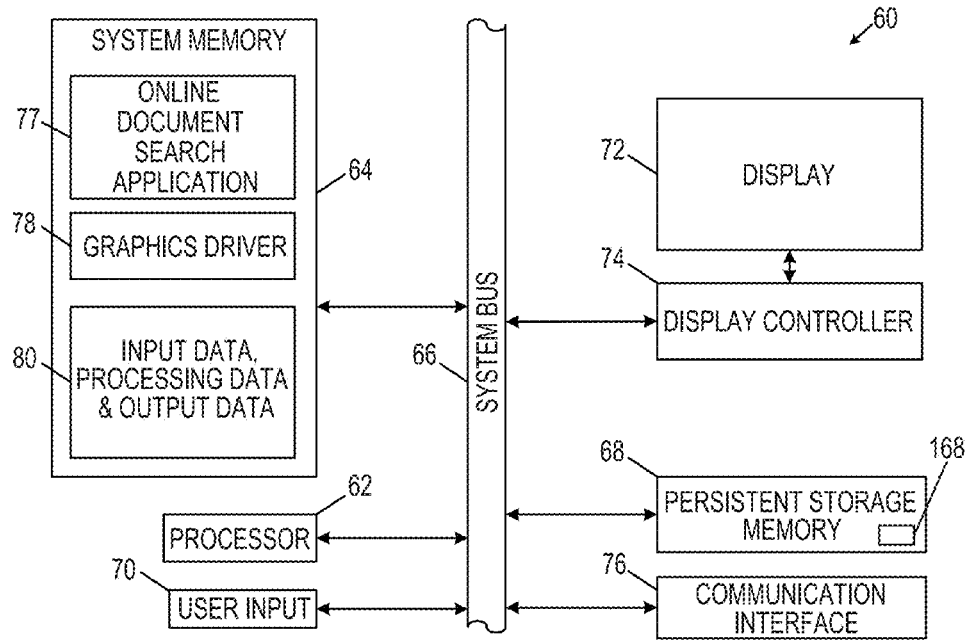
FIG. 3A is a block diagram of an example of a network node according to the present disclosure.
Figure 3B:
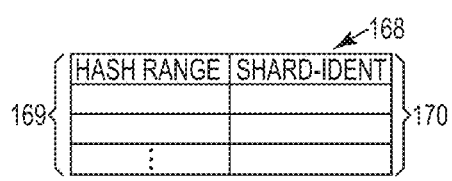
FIG. 3B illustrates a table to associate a given geo-hash value to a particular database server according to the present disclosure.

In one example, the memory includes a data structure stored in the memory 64, 68 and used by the application program 77 of FIG. 3A. The data structure of FIG. 1E can include information resident in a number of databases 28, 29 geographically-partitioned (geo-partitioned) in a predetermined manner according to a number of shards. FIG. 3A illustrates that the persistent memory 68 can include a geographically-hashed (geo-hash) look up table 168. FIG. 3B illustrates that the geo-hash look up table 168 contains a number of geo-hash ranges 169 associated with respective geographic location identifiers 170. The geo-hash look up table 168 receives a function call including a geographic location identifier and a client network node identifier as parameters to the function call and uses the table 168 to link the client network node to a particular server node 27, 60 and an associated gee-partitioned database 28, 29 containing the geo-hash ranges in a shard data object table 39 associated with the received geographic location identifier. Each shard data object table 39 can contain a number of data attributes including a shard data attribute 139, a user data attribute 140, a geographic location data attribute 141, a URL data attribute 142, a tag and/or comment data attribute 143, a bid data attribute 144, a referenced URL data attribute 145, a title data attribute 146, a number of views attribute, etc.

As shown in FIG. 1E a plurality of user data object tables 33 are part of the data structure. Each user data object table 33 contains respective user data attributes including user recommendation credit data attributes 133 associated with a particular user data attribute 134. The plurality of user data object tables 33 link to the particular server node 27, 60 and the associated geo-partitioned database 28, 29. As shown in FIG. 1E the data structure can link a particular user to the particular server node and the associated gee-partitioned database based on the geographic location identifier. In effect, the data structure can link a given client network node to the particular server node and a particular geo-partitioned database having MPL information indexed according to URLs based on the geographic location identifier.

In one example, using the tag and/or comment data attribute 145, the referenced URL data attribute and the user data attributes 134/140 the data structure can link the particular user to the particular server node and the particular geo-partitioned database in order to index by URL a comment, regarding an MPL from the particular user, based on the geographic location identifier.

As shown in FIG. 1E, the data structure can include a note object table 37, having a number of data attributes including an identifier data attribute, a user data attribute, a title data attribute, a note data attribute, a timestamp data attribute, a parent note data attribute, etc., logically linked to the particular user data object table 33. The data structure can further include a reward object table 31 physically linked (e.g., actually electronically connected versus logically linked as a virtual connection) to the particular user data object table 33. In one or more embodiments the data structure includes a friend object table 35 physically linked to the particular user data object table 33. An advertisement object table 43 is logically and physically linked to the shard object table 39. In one or more embodiments a URL object table 45 can be physically linked to the advertisement object table 43 and an advertisement log object table 47 can be logically linked to the advertisement object table 43.

Figure 1F:
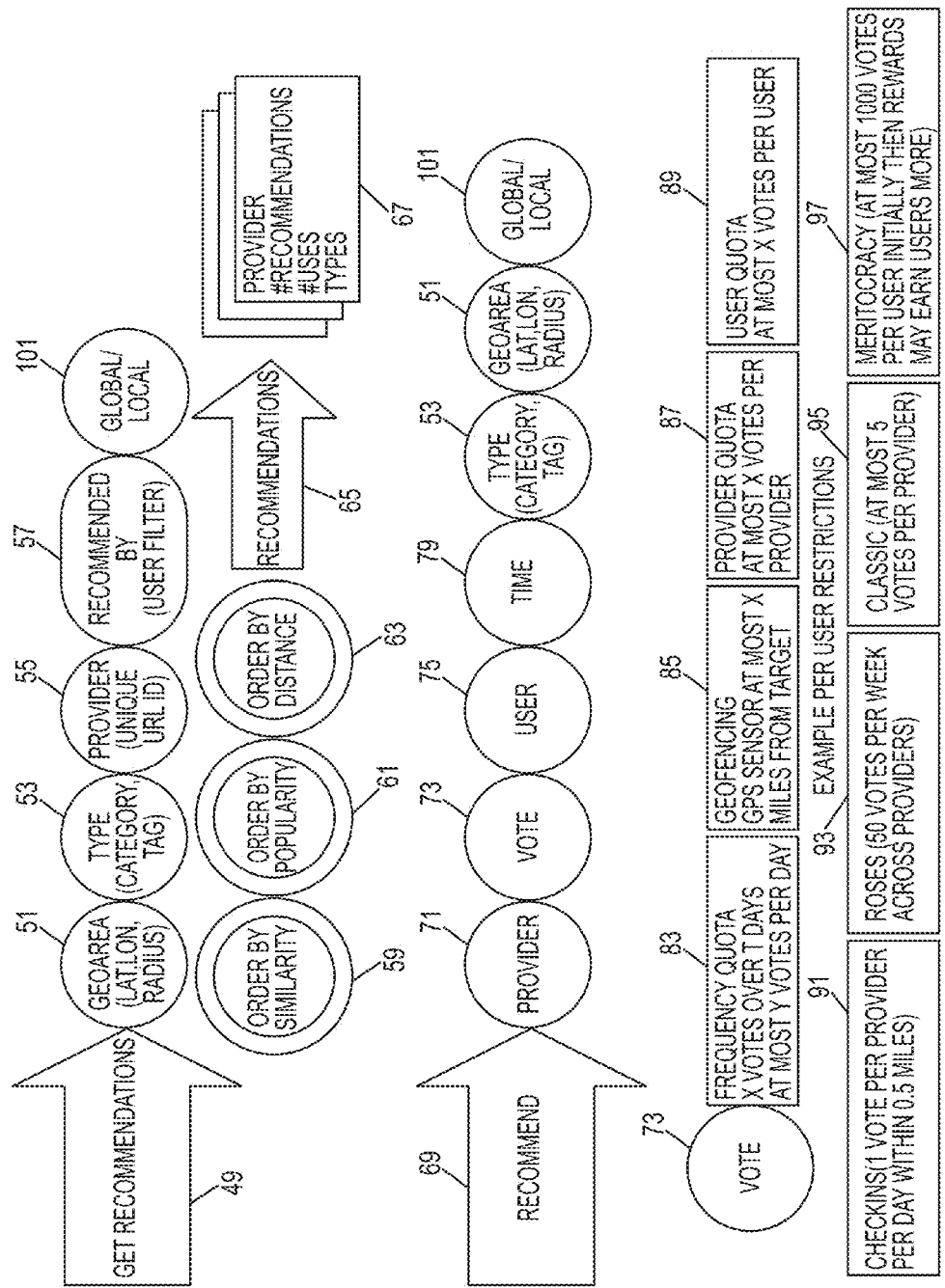
FIG. 1F is a flow chart illustrating an example operation of a platform for online content services according to the present disclosure.

FIG. 1F is a flow chart illustrating an example operation of a platform for online content services according to the present disclosure. A get recommendations command 49 can be received. Recommendation 65 can be filtered by geographic area 51, type 53, provider 55, by the user(s) making the recommendations 57, and/or by whether the recommendations are intended to be visible globally or locally 101. A geographic area can be defined by, for example, latitude, longitude, and/or be constrained by a particular radius from the geographic coordinates. Recommendations 65 can have a particular type 53 (e.g., a category and/or a tag, such as from a hierarchical folksonomy of tags). Recommendation 65 can be associated with an indication 55 of a particular provider of the content being recommended (e.g., a unique URL and/or identifier). In some instances the indication 55 of the provider can be generic to a provider of the content where a provider includes more than one specific instance. For example, when the content includes mobile print locations, one provider could be a commercial mailing company that has multiple instances (e.g., specific stores). In such examples, the identifier 55 of the provider can indicate either the commercial mailing company generically, or it can indicate a specific store of the commercial mailing company. Recommendations 65 can include an indication 57 of the users submitting the recommendations 65 and/or can be filtered such that particular users (e.g., "friends") have exclusive or more heavily weighted influence on the result (e.g., suggestion) of the recommendations 65.

Recommendations 65 can be ordered by similarity 59 (e.g., by similarity of content for divergent recommendations and/or by similarity of recommendations for divergent content), by popularity 61 (e.g., by total number of recommendations and/or a most favorable average recommendation), and/or by distance 63 (e.g., distance from the requesting user's present location). A provider 67 of content can be associated with various additional information such as an identifier of the provider (e.g., identifier 55), a total number of recommendations (e.g., explicit recommendations) for the provider and/or the provider's content, a total number of uses of the provider and/or the provider's content (e.g., implicit recommendations), and/or a type of the content being provided. For example, a type of content, in the case of a mobile print provider service, can include color printers.

A recommendation 69 submitted by a user can be accompanied by information including, for example, an identity of the provider 71 of the content being ranked, a value (e.g., "vote") 73 of the recommendation 69, an identity 75 of the user submitting the recommendation 69, a time 79 that the recommendation 69 was submitted, a type 53, a geographic area 51, and/or whether the recommendation was intended by the user to be visible globally (e.g., by everyone using the platform) or locally (e.g., by people within a certain geographic region 101. The identity 75 of the user can be a user ID as determined from a login directly to the platform, a user ID as determined according to an interface with a social networking service (e.g., Facebook® Connect), or a user ID as determined from network information such as an IP address, among others.

An economic recommendation model can be provided to help assure that the platform provides meaningful results (e.g., as opposed to some previous approaches that do not constrain users' ability to recommend various content). A user's recommendations (e.g., votes) 73 can be constrained by one or more economic recommendation models such as a frequency quota 83, geofencing 85, a provider quota 87, and/or a user quota 89. A frequency quota 83 can limit a user to providing X votes over T days and/or at most Y votes per day. Such frequency quotas 83 can help prevent users from spamming a particular provider with recommendations (e.g., where the user has a pecuniary interest in having a particular provider receive recommendations). Geofencing 85 can include the use of GPS or other location-determining means (e.g., IP address, cell triangulation, user-provided location) to limit a user's ability to provide recommendations to providers within X distance (e.g., miles) from the target provider being recommended.

Thus, geofencing 85 can help prevent users from recommending a particular provider when it is clear that the user is not currently using the services of the provider. A provider quota 87 can limit a particular provider of content to receiving at most X votes per a given time period. The provider quota 87 can help prevent a provider from cheating the system by having different users fraudulently recommend the provider. A user quota 89 can limit a user to providing no more than X unexpired votes. The user quota 89 can help prevent an "overly positive" user from providing what may be considered arbitrary recommendations for a multitude of content providers. The use of the variables X, T, and Y in the discussion of FIG. 1F is arbitrary and does not imply a correlation between different economic recommendation models (e.g., the X in the frequency quota 83 may be the same or different than the X in geofencing 85).

An economic recommendation model can limit a user's recommendations according to a "checkins" model 91 where a user is limited to X recommendations (e.g., 1 vote) per provider per time period (e.g., day) within a given distance (e.g., 0.5 miles). Such a model can help to assure that the user actually used the provider (e.g., via the distance requirement) and help to assure that the user does not spam a provider with recommendations (e.g., via the limited recommendation's per time period requirement). An economic recommendation model can limit a user's recommendations according to a "roses" model 93 where a user is limited to X recommendations (e.g., 50 recommendations) per week across all providers. Such a model can help to limit "overly positive" users (e.g., as described above) from skewing results based on their recommendations. An economic recommendation model can limit a user's recommendations according to a "classic" model 95 where a user is limited to at most X recommendations (e.g., 5 votes) per provider. The use of the term "classic" does not imply that such a model has previously been used, but implies that such a model may be implemented as a more basic feature. An economic recommendation model can limit a user's recommendations according to a meritocracy model 97 where the user has an initial quota (e.g., 1000 votes) that can be replenished according to a rewards system (e.g., based on a determination of a quality of the feedback, such as meaningful and/or honest feedback by the user, among other determinations). The economic recommendation models described herein can be used independently or in any combination.

Figure 2:
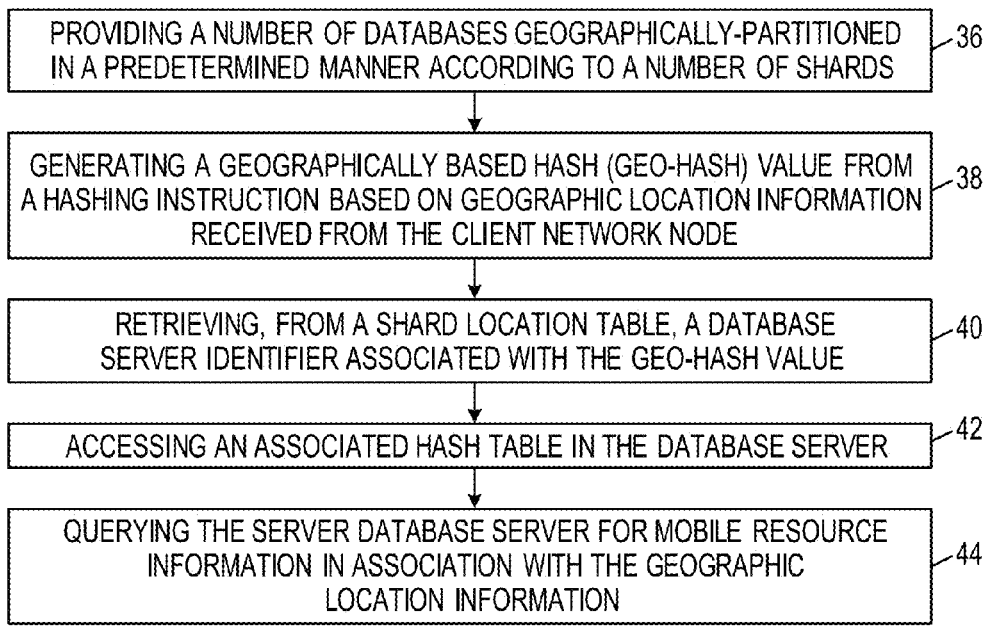
FIG. 2 is a flow chart illustrating an example of a method for interacting with a data structure according to the present disclosure.

FIG. 2 is a flow chart illustrating an example of a computer implemented method of interacting with a data structure to exchange mobile resource information between a client network node and an online search system. As shown in the embodiment of FIG. 2, one method includes providing, at block 36, a number of databases geographically-partitioned according to a number of shards as part of the online search system.

In one implementation, providing the number of databases geographically-partitioned according to the number of shards includes providing the number of databases partitioned into geographic areas for cell sizes, i.e., shards, such that search queries limited to thirty miles from a particular geographic location can touch between one to four shards. In at least one embodiment the number of databases are partitioned into a geographic area cell size of ninety seven (97) by ninety seven miles.

Groups of tables/shards can be collected but some hotspot shards may by off-loaded to external nodes. The server nodes are designed to be stateless such that operations may be performed efficiently with only local data. In some implementations, only authentication and reporting data are kept global.

Given this highly distributed infrastructure feeding new data into the system and creating global reports can be highly parallelized and performed concurrently by multiple cores or by multiple nodes in a MapReduce cluster. Apart from uploading new data into the shards, this kind of parallel processing can also be performed when computing contribution rewards, most popular site trends, and channel heatmaps.

At 38, the method includes generating a geographically based hash (geo-hash) value from a hashing algorithm based on geographic location information received from the client network node. In at least one embodiment providing the number of databases geographically-partitioned according to the number of shards includes providing the number of databases partitioned according to the first three characters of the generated geo-hash value. That is, a Geohash algorithm may be leveraged to map locations in queries into geographic area. The areas constitute Grid cells of 97×97 miles using a 3 character, 32 letter alphabet. Search inquiries are limited to 30 miles and can touch between 1-4 Grid cells, called shards. Each shard is implemented as a RDBMS table. The tables are located at runtime making it easy to distribute content from different geographic regions on different server nodes 27 in a cloud/data center. With this scheme 32×32×32=32768 shards can be created in use.

The method additionally includes retrieving, from a shard location table, a database server identifier associated with the geo-hash value, at 40, and accessing an associated hash table in the identified database server at 42. In some implementations, the shards are not allowed span partitions for efficiency. In such implementations, within the same shard group (e.g., sorted region of shards hosted on the same database server), recommendations are limited by a user-specified radius away from a particular location (e.g., latitude, longitude coordinate) and the total number of hits requested. Both of these may have upper limits to fit the display layouts of the client network nodes and to preserve server scalability. When a new item is recommended in a new shard, that shard may be created in real time in-band (e.g. on the same computing platform). Thus, not all possible shards have to be created. To serve about 7 million recommendations spread globally in the inhabited areas on Earth as few as 12,000 shards may be used.

As shown at 44 this example method can include querying the identified database server for mobile resource information in association with the geographic location information. That is, in some implementations, the data structure is organized to enable instructions to execute to query the identified database server for mobile resource information using the first three characters of the generated geo-hash value. In at least one embodiment, the data structure is organized to enable instructions to execute to query the identified database server for mobile resource information according to a URL for one of: a popularity ranking, a distance ranking, and a similarity ranking.

In one or more implementations, the data structure is organized to enable instructions to execute and access the data structure to aggregate query results based on a number of views, a set of tags, a number of geographic locations and a set of titles from a shard table in the identified database server, e.g., in association with queries for online documents or mobile print locations (MPLs). Further, in some implementations, the data structure is organized such that instructions can execute to filter query results according to a tag identifier, a user identifier, a referenced URL identifier, a title, and a regular expression identifier, e.g., in association with queries for online documents or mobile print locations (MPLs).

Further, in some implementations, a geo-hashed data structure is provided that is organized to be used in connection the above API discussion and enable instructions to execute to receive user recommendation information associated with a referenced URL identifier, e.g., online document or mobile print location (MPL) provider URL identifier. In such implementations, instructions may be executed to index online the recommendation information in a URL database from among the geo-partitioned databases based on the geographic location information.

FIG. 3A is a block diagram of an example of a network node according to the present disclosure. FIG. 3A shows an example 60 of the server network node 27 that includes a processor 62 (e.g., a CPU), a system memory 64, and a system bus 66 that couples processing unit 62 to the various components of the server network node 60. The processor 62 typically includes one or more processors, each of which may be in the form of any one of various commercially available processors, generically referred to herein as "processing resources." The system memory 64 typically includes a read only memory (ROM) that stores a basic input/output system (BIOS) that contains start-up routines for the server network node 60 and a random access memory (RAM). The system bus 66 may be a memory bus, a peripheral bus or a local bus, and may be compatible with any of a variety of bus protocols, including PCI, VESA, Microchannel, ISA, and EISA. The server network node 60 also includes a persistent storage memory 68 (e.g., a hard drive, a floppy drive, a CD ROM drive, magnetic tape drives, flash memory devices, and digital video disks) that is connected to the system bus 66 and contains one or more computer-readable media disks that provide non-volatile or persistent storage for data, data structures and computer-executable instructions.

A user may interact (e.g., enter commands or data) with the computer 60 using one or more input devices 70 (e.g., a keyboard, a computer mouse, a microphone, joystick, and touch pad). Information may be presented through a graphical user interface (GUI) that is displayed to the user on a display monitor 72, which is controlled by a display controller 74. The server network node 60 also typically includes peripheral output devices, such as speakers and a printer. One or more remote computers may be connected to the server network node 60 through a network interface card (MC) 76.

As shown in FIG. 3A, the system memory 64 also stores an online search application 77, and a GUI driver 78, and input data, processing data, and output data 80. The online search application 77 is executed by the server network node 60 in order to implement the functionality of the online search system 16. In some embodiments, the online search application 77 interfaces with the GUI driver 78 and the user input 70 to control the operation of the online search system.

FIG. 3B illustrates a table 168 (e.g, a geo-hash value look table) to associate a given geo-hash value 169 (e.g., range) to a particular database server 170 (e.g., shard identifier). As shown in FIG. 3B, once a given geo-hash value is computed for a given received geographic location identifier from a particular client network node 12, 14 the computer executable instruction can be executed by the processor resource to determine which database server 28, 29 to link to and further access.

Figure 4:
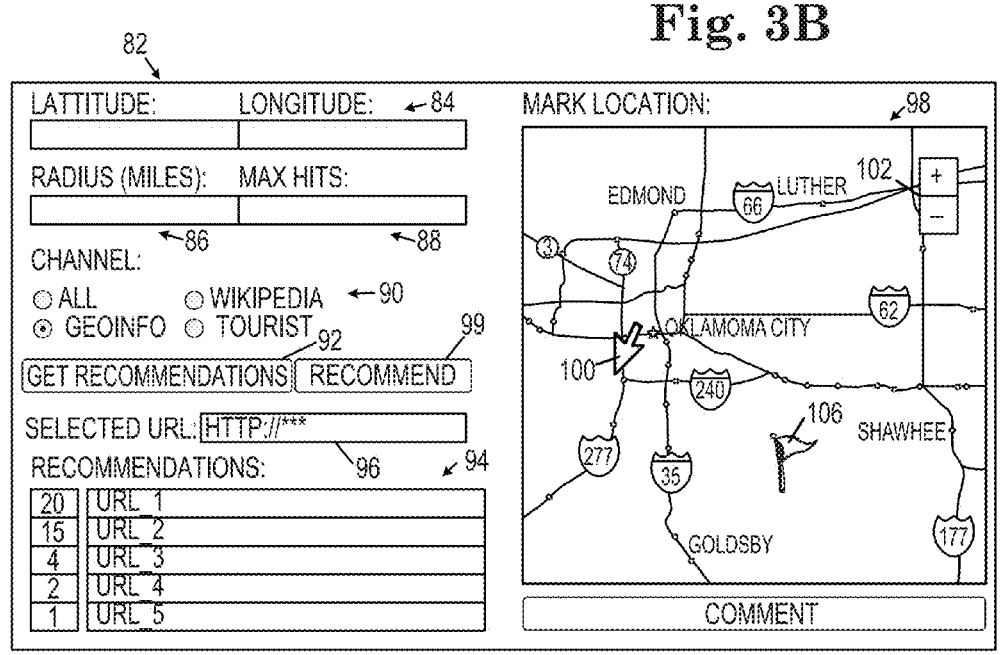
FIG. 4 is a diagrammatic view of an example of a client user interface according to the present disclosure.

FIG. 4 is a diagrammatic view of an example of a client user interface according to the present disclosure. FIG. 4 shows an example of a graphical user interface 82 that is generated by the communications applications 26 and displayed on the display of the client network nodes 12, 14. The graphical user interface 82 includes a geographic coordinates display area 84, a geographic range input area 86, an input area 88 for specifying a maximum number of search results, a channel selection area 90, a "Get Recommendations" button 92 for requesting online recommendations from the online search system 16, a "Recommendations" display area 94, a "Selected URL" display area 96, and a map area 98. The graphical user interface 82 also includes a "Recommend" button 99 that allows the user to submit a recommendation for the selected identifier appearing in the "Selected URL" display area 96.

The geographic coordinates display area 84 displays the latitude and longitude coordinates of a particular location. The latitude and longitude coordinates may be input by the user (e.g., by manually typing into the associated boxes, or by using a pointer 100 to select a location on a map that is displayed in the map area 98) or they may be obtained automatically by searching by address identifiers (e.g., street, zip, city etc) or obtaining a reading from a location sensor (e.g., a built-in GPS receiver) that is associated with the client network node. These geographic coordinates collectively constitute a geographic location identifier that identifies a particular location to the online search system 16 (e.g., MPL search system). The geographic range input area 86 allows the user to identify a target geographic location by specifying a value of a radius of a circular region that is centered at the latitude and longitude coordinates in the geographic coordinates display area 84. In other examples, the user may identify a target geographic location in other ways. For example, the user may use the pointer 100 to draw a rectangular boundary of the target geographic location on the map that is displayed in the map area 98. Alternatively, the user may use the magnification controller 102 to select a magnification level of the map in the map area 98 such that the entire geographic region appearing in the map area 98 corresponds to the target geographic location.

The user selects one of the channels in the channel selection area 90 to specify a channel that will be associated with a recommendation or that will be used by the online search system 16 to restrict the online search to only those online documents that are associated with channel identifiers that correspond to the specified channel. The user can select one of the channels as it applies to MPLs (e.g., "laser", "color", "high resolution", etc.) in the channel selection area 90 to specify a channel that will be associated with a recommendation or that will be used by the MPL search system 16 to restrict the MPL search to only those MPLs that are associated with channel identifiers that correspond to the specified channel.

In some examples, users are given the option to limit online searches to only those online documents and/or MPLs that are associated with recommendations from a target group of user identifiers. The target group of user identifiers may, for example, consist of the user identifiers for the user's friends, the user's family members, or the user's co-workers. The target group also may be used to allow self-filtering to provide a personal bookmarking service. The online search system 16 can store the identified target groups in the user account records 34 in the database 32.

The user selects the "Get Recommendations" button 92 to submit a request for recommendations from the online search system 16. In response to the receipt of the location information (e.g., the geographic coordinates and the geographic range information) from a searching client network node, the online search system 16 identifies ones of the identifiers that are associated with respective ones of the geographic location identifiers in the database that correspond to the received location information. If a target channel is specified by the user, the online search system 16 additionally filters the identifiers by selecting only those identifiers that are associated with channel identifiers that match the target channel identifier. If a target set of user identifiers is specified by the user, the online search system 16 additionally filters the identifiers by selecting only those identifiers that are associated with user identifiers that match any of the specified target user identifiers.

The online search system 16 ranks the identified ones of the identifiers based on the recommendation information that respectively is associated with the identifiers. In this process, the online search system 16 typically aggregates the credits that are allocated to each of the identifiers. If a target set of user identifiers is specified by the user, the online search system 16 determines the rankings based on only the recommendation information received from the specified target set of user identifiers.

The online search system 16 returns a list of the ranked identifiers (up to the maximum number specified in the input area 88) to the searching client network node. The ranked list of identifiers is displayed in the "Recommendations" display area 94 of the graphical user interface 82. Each of the identifiers (i.e., URL_1, URL_5) is presented in association with a respective ranking (i.e., 20, 15, 4, 2, 1) that was determined by the online search system 16 based on the recommendations that were received for the corresponding online documents and/or MPLs. In some examples, the online search system 16 also returns other metadata, such as title and sample and average geographic coordinates associated with the identifiers to be returned in response to user queries.

In response to the selection of one of the identifiers (e.g., URL_1) in the "Recommendations" display area 94, the communications application 26 copies the selected identifier into the "Selected URL" display area 96 and marks (e.g., with a flag icon 106) the location of map in the map area 98 that corresponds to the geographic location identifier that is associated with the selected identifier. In some examples, the online search system returns the average of the geographic coordinates associated with the identifiers in the "Recommendations" display area 94, and the communications application 26 displays and maps the average location. When a user wishes to recommend a particular online document and/or MPL, the user identifies the identifier to the communications application 26 simply by browsing to the particular online document and/or MPL with a browser application.

Figure 5:
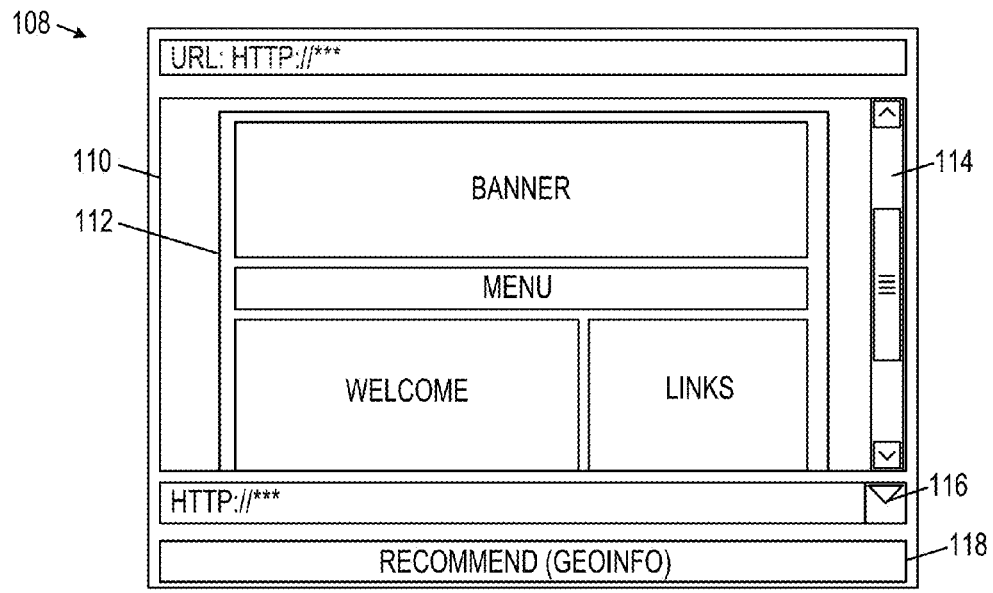
FIG. 5 is a diagrammatic view of another example of a client user interface according to the present disclosure.

FIG. 5 is a diagrammatic view of another example of a client user interface according to the present disclosure. In FIG. 5, the communications application 26 also opens up a graphical user interface 108 that includes a browser window 110, which displays a graphical representation 112 of the online document and/or MPL that corresponds to the selected online identifier. The browser window 110 optionally includes a scroll bar 114 that allows the user to scroll through the online representation 112. The interface 108 additionally includes a recommendations control 116 and a "Recommend" button 118, which includes a label (e.g., "geoinfo") that identifies the current channel that was selected by the user. In some examples, the graphical user interface 108 also includes a "Channel" button which causes the communications application 26 to submit to the online search system 16 a search on the most popular channels in the current geolocation. This information gives the user a hint what it makes sense to filter on.

Figure 6A:
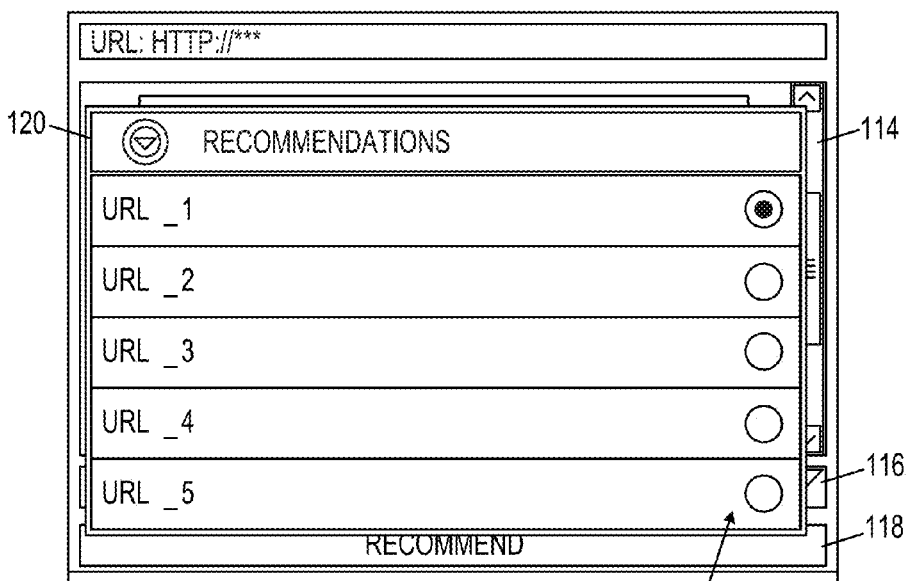
FIG. 6A is a diagrammatic view of an another example of a client user interface according to the present disclosure.

FIG. 6A is a diagrammatic view of an example a client user interface according to the present disclosure. Referring to FIG. 6A, in response to user selection of the recommendations control 116, the communications application 26 opens a separate "Recommendations" window 120 that presents the ranked list of online document or MPL identifiers that was received from the search system 16. The user may select one of the presented online document or MPL identifiers to browse by selecting the associated one of the radio control buttons 122 in the recommendations window 120.

In response to user selection of the "Recommend" button 99 in the graphical user interface 82 (FIG. 4) or the "Recommend" button 118 in the graphical user interface 108 (FIG. 5), the communications application prepares a submission and sends the submission to the search system 16. The submission includes recommendation information in association with the current location information that is specified in geographic coordinates display area 84 (and optionally includes the geographic range information specified in the input area 88) and the identifier of the currently selected online document or MPL identifier. In some examples, the recommendation information is specified by a set of recommendation configuration settings, which may be fixed or customizable by the user. The recommendation configuration settings typically include a user identifier that identifies the user and an amount of credit (also referred to as "submission credit") to allocate for each recommendation. In other examples, for each submission, the communications application 26 opens a dialog box that allows the user to specify at least some of the recommendation information that will be transmitted with the submission. The specified recommendation may include, for example, the amount of credit to allocate to the selected online document or MPL, and an indication whether the recommendation is for (positive) or against (negative) the selected online document or MPL.

In response to receipt of the submission from the client network node, the search system 16 indexes the respective recommendation information and the respective online document or MPL identifier in association with the respective geographic location identifier in the recommendation records database 28.

In some examples, the online search system 16 allows users to submit user-generated comments (or notes) in association with respective geographic location identifiers that identify respective geographic locations. This feature allows a user to submit a user-generated comment for an online document or MPL and a point of interest (e.g., the location of a business or other location), even those points of interest that currently do not have an online presence (e.g., they are not associated with any online document, such as a web page). The geo-tagged comments are hosted by the search system 16, which allows the comments to be treated in the same way as other online documents or MPLs by the search system 16. For example, users of the client network nodes 12, 14 can submit recommendations for comments and the comments can be filtered based on channel selections and identification of target groups of user identifiers (e.g., friends).

Figure 6B:
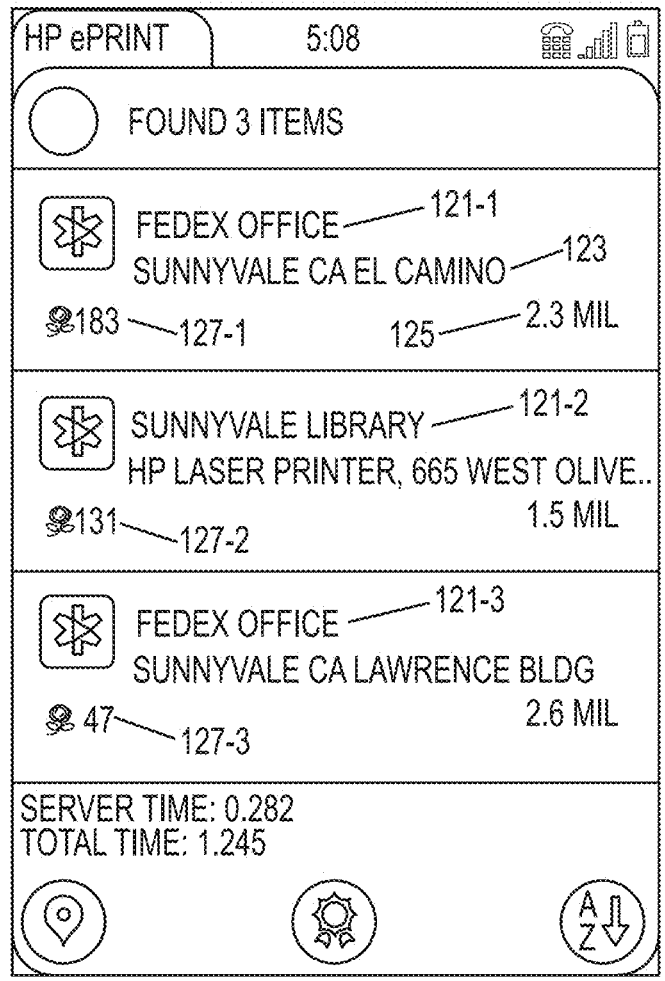
FIG. 6B illustrates an example view and an example user interface for recommending print locations according to the present disclosure.

FIG. 6B illustrates an example view and an example user interface, such as the window in FIG. 6A, for recommending print locations (e.g., MPLs) according to the present disclosure. A display on the user interface can include a listing of MPL information including the names of a number of MPLs, the provider's distance from the user, the geographic location of the provider, and the provider's compiled recommendation. For example, the name of an online document or MPL is displayed at 121-1, and the geographic location of the provider is displayed at 123. A distance from the user to the provider is displayed at 125, and the provider's compiled recommendation is provided at 127-1. In the example in FIG. 6B, providers are listed in order of their recommendations, with the most highly recommended provider being displayed first. Provider 121-1 received a higher compiled recommendation than did providers 121-2 and 121-3, as illustrated at 127-1, 127-2, and 127-3, and is therefore displayed first.

Figure 6C:
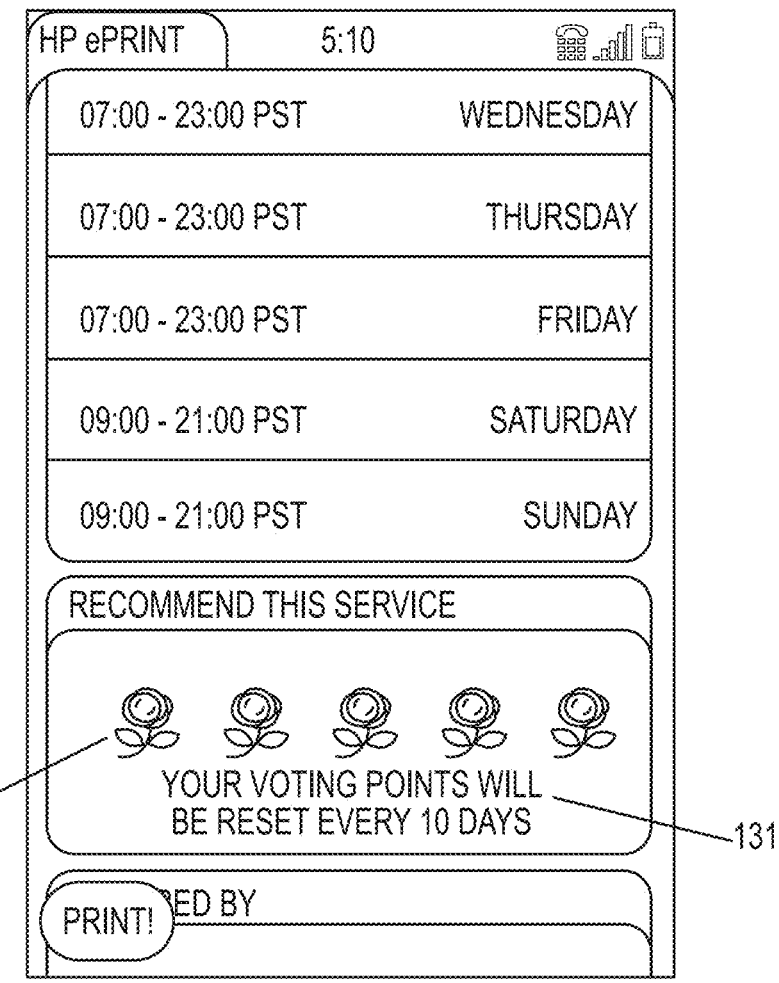
FIG. 6C illustrates another example view and another example user interface for recommending print locations according to the present disclosure.

FIG. 6C illustrates an example view and an example user interface for recommending print locations according to the present disclosure. An available number of a recommendation credit identifiers, or "votes", can be seen at 129. A user can be assigned a budget of votes (e.g., a predetermined temporal budget), and these votes can be represented by a symbol, such as roses, as seen at 129 of FIG. 6C. The budget may include a time limit, as well. For example, the user may be allowed a particular number of votes over a certain time period (e.g., 10 days) as seen at 131 of FIG. 6C. A user can click on one or more votes (e.g., roses) to submit a recommendation of the online document or MPL. A first provider having more votes than a second provider may be ranked higher overall in the Gloe ranking system.

Figure 6D:
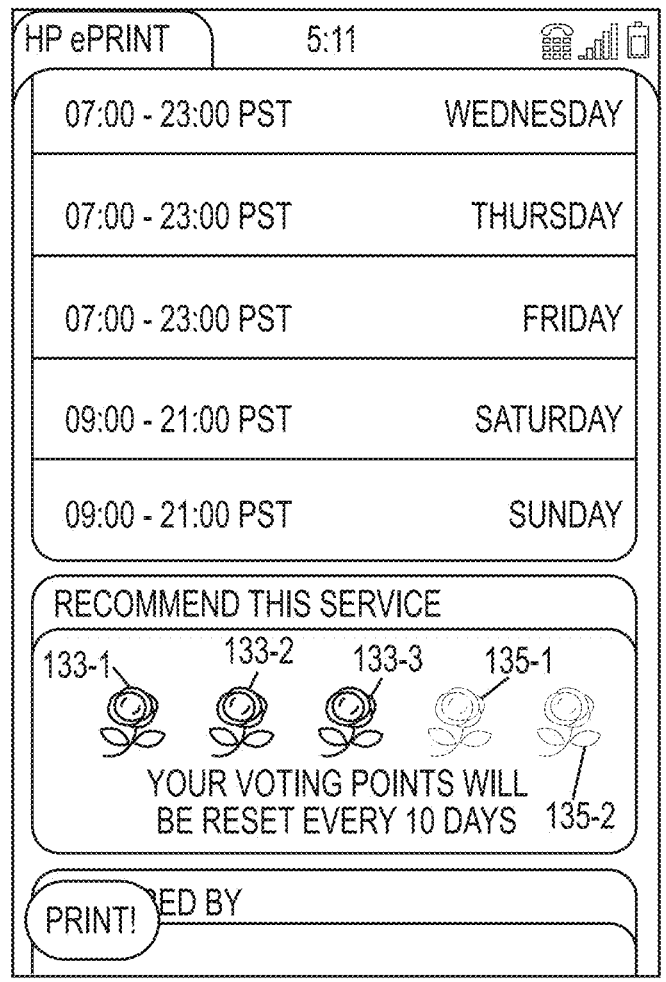
FIG. 6D illustrates another example view and another example user interface for recommending print locations according to the present disclosure.

FIG. 6D illustrates an example view and an example user interface for recommending print locations according to the present disclosure. The example view in FIG. 6D illustrates what a viewer may see after submitting votes for an online document or MPL. As a user clicks on a vote (e.g., a rose) to recommend the online document or MPL, the vote symbol changes its appearance in order to show the user that the vote has been cast. For example, in FIG. 6D, roses 133-1, 133-2, and 133-3 have not been selected, but a user has clicked on roses 135-1 and 135-2, and therefore submitted votes for the online document or MPL.

Figure 7:
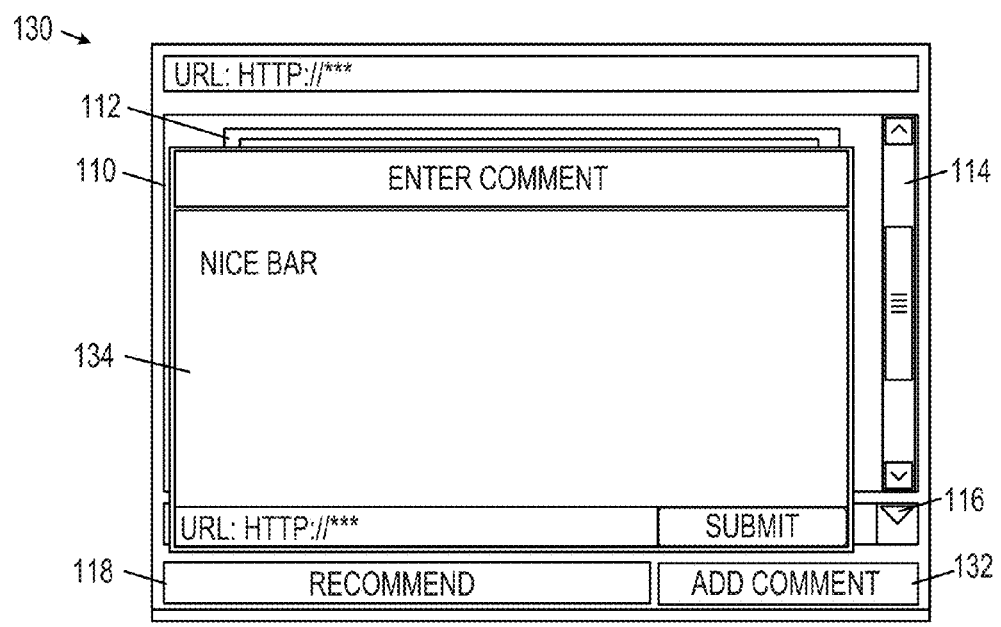
FIG. 7 is a diagrammatic view of another example of a client user interface according to the present disclosure.

FIG. 7 is a diagrammatic view of an example of a client user interface according to the present disclosure. FIG. 7 shows an example 130 of the browser window 82 that additionally includes an "Add Comment" button 132. In response to user selection of the "Add Comment" button 132, the communications application 26 opens an "Enter Comment" window 134 that allows the user to enter a comment (e.g., "Nice Bar"). In response to user selection of a "Submit" button in the "Enter Comment" window 132, the communications application 26 prepares a comment submission that includes the user-generated comment along with the user identifier that identifies the user, a geographic location identifier that identifies the currently selected location, and optionally includes an MPL identifier (if one is specified).

By way of example and not by way of limitation, FIG. 7 shows the graphical user interface (GUI) for an online document search system 16. In accordance with this method, the search system 16 receives a respective submission from a given client network node, e.g., 12 and/or 14. The submission includes a user-generated comment that is generated by a user of the given client network node in association with a respective geographic location identifier identifying a respective geographic location. The online search system 16 can create a respective online document identifier of the user-generated comment.

According to one or more examples, the online search system 16 indexes the online document identifier of the user-generated comment in association with the respective geographic location identifier in the database.

A number of methods can be implemented by an online search system. In accordance with one of the number of methods, the online search system receives a respective submission from a given client network node. The submission includes a user-generated comment that is generated by a user of the given client network node in association with a respective geographic location identifier identifying a respective geographic location. The online search system creates a respective online document or MPL identifier of the user-generated comment. The online search system indexes the respective online document or MPL identifier of the user-generated comment in association with the respective geographic location identifier in the database.

Once a comment has been indexed, the online search system 16 is able to serve a renderable description of a graphical representation of the user-generated comment in response to receipt of a request from a client network node to view content associated with the online document or MPL identifier of the user-generated comment. In some embodiments, when an online document or MPL is displayed in the browser window, the most popular comments that are associated with that online document or MPL in the current geo-location also will be displayed. In addition, the online search system 16 is able to receive a respective submission from a particular client network node in connection the hosted comment. The submission can include, for example, respective recommendation information in association with the respective online document or MPL identifier identifying the user-generated comment and a respective geographic location identifier identifying a respective geographic location. In response to the receipt of such a submission, the online search system 16 indexes the respective recommendation information and the respective online document or MPL identifier of the user-generated comment in association with the respective geographic location identifier in the database 28.

As described in connection with FIGS. 6A-6D, the number of recommendations that a particular user may make within a time span is limited by the amount of credit that the user currently has available. Recommendation credits (or tickets) may be granted or purchased and used to increase prominence of an online document or MPL in connection with a geographic location. For example, users can be periodically issued credit (which also may be referred to as "currency") in the form of granted or purchased tickets that allows them to recommend a certain number of online documents or MPLs within a specified time window.

Figure 8:
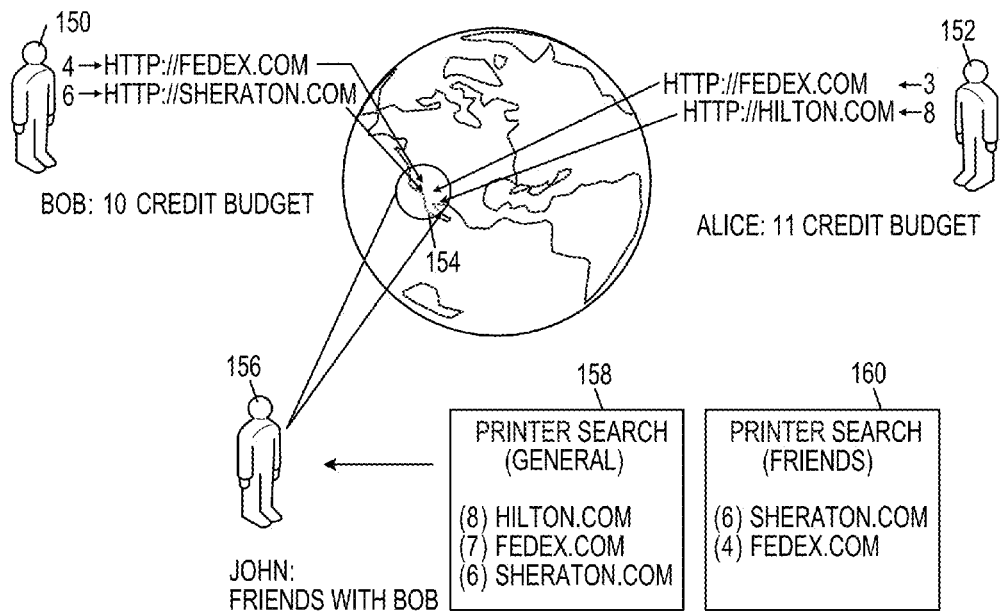
FIG. 8 is a diagrammatic view of an example of an online search based usage model according to the present disclosure.

FIG. 8 is a diagrammatic view of an example of an online search based usage model according to the present disclosure. FIG. 8 shows an example of an online search (e.g., online document or MPL search) based usage model in which a first user 150 ("Bob") and a second user 152 ("Alice") both submit recommendations for MPLs in association with particular geographic locations within a circular geographic region 154, and a third user 156 ("John") submits requests for MPL identifiers that are associated with recommendations in the geographic region 154. In this example, Bob submits a 4-credit recommendation for the online identifier http://sheraton.com and a 6-credit recommendation for the online identifier http://fedex.com. Alice submits a 3-credit recommendation for the online identifier http://fedex.com and an 8-credit recommendation for the online identifier http://hilton.com. John submits two search requests. The first search request is a general search request for all the printing sites (e.g., MPLs) that are associated with the geographic region 154. In response to the first search request, the online search system 16 returns a ranked list 158 of the most popular (e.g., highest aggregated credit score) identifiers (URLs in the illustrated example) that are associated with the geographic region 154. The second search request is a friends-filtered search request for the printing sites that are associated with the geographic region 154 and are recommended by John's friends (e.g., Bob). In response to the second search request, the online search system 16 returns a ranked list 158 of the most popular (i.e., highest aggregated credit score) identifiers (URLs in the illustrated example) that are associated with the geographic region 154 and are recommended by Bob.

Figure 9:
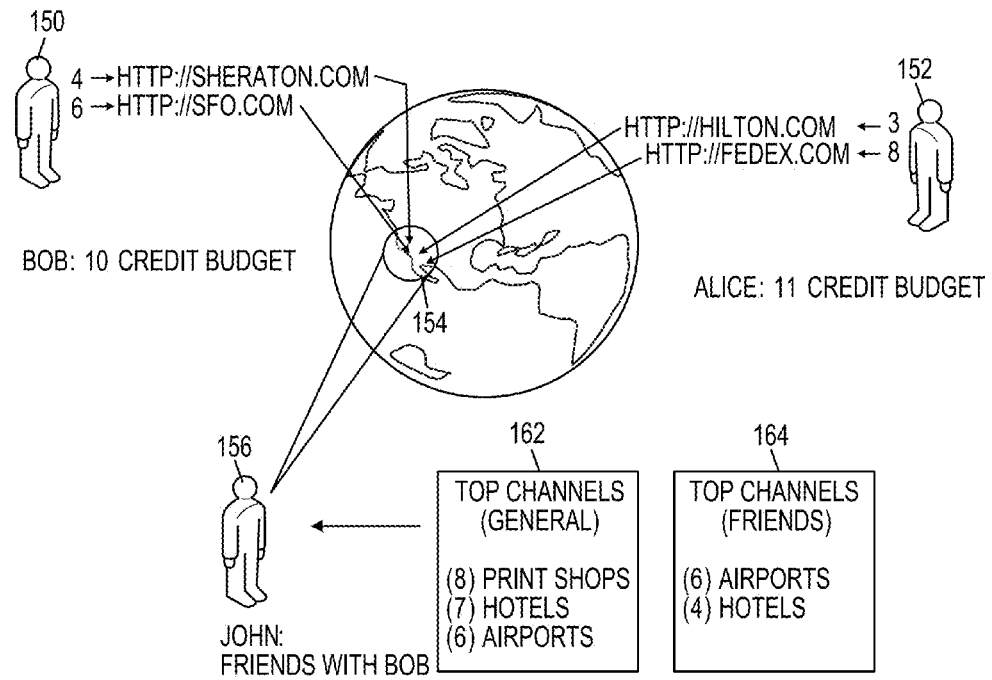
FIG. 9 is a diagrammatic view of an example of an online search based usage model according to the present disclosure.

FIG. 9 is a diagrammatic view of an example of an online search (e.g., MPL search) based usage model in which the first user 150 ("Bob") and the second user 152 ("Alice") both submit recommendations for MPLs and/or online documents associated with particular restaurants located within the circular geographic region 154, and the third user 156 ("John") submits requests for MPL identifiers that are associated with recommendations in the geographic region 154. In this example, Bob submits a 4-credit recommendation for the identifier http://sheraton.com in association with a "hotel" channel and a 6-credit recommendation for the identifier http://sfo.com in association with an "airport" channel. Alice submits a 3-credit recommendation for the identifier http://hilton.com in association with a "hotel" channel and an 8-credit recommendation for the identifier http://fedex.com in association with a "print shops" channel. John submits two search requests. The first search request is a general search request for the most popular channels that are associated with the geographic region 154. In response to the first search request, the online search system 16 returns a ranked list 162 of the most popular (e.g., highest aggregated credit score) channels that are associated with the geographic region 154. The second search request is a friends-filtered search request for the most popular channels that are associated with the geographic region 154 and are recommended by John's friends (e.g., Bob). In response to the second search request, the online search system 16 returns a ranked list 164 of the most popular (e.g., highest aggregated credit score) channels that are associated with the geographic region 154 and are recommended by Bob.

Figure 10:
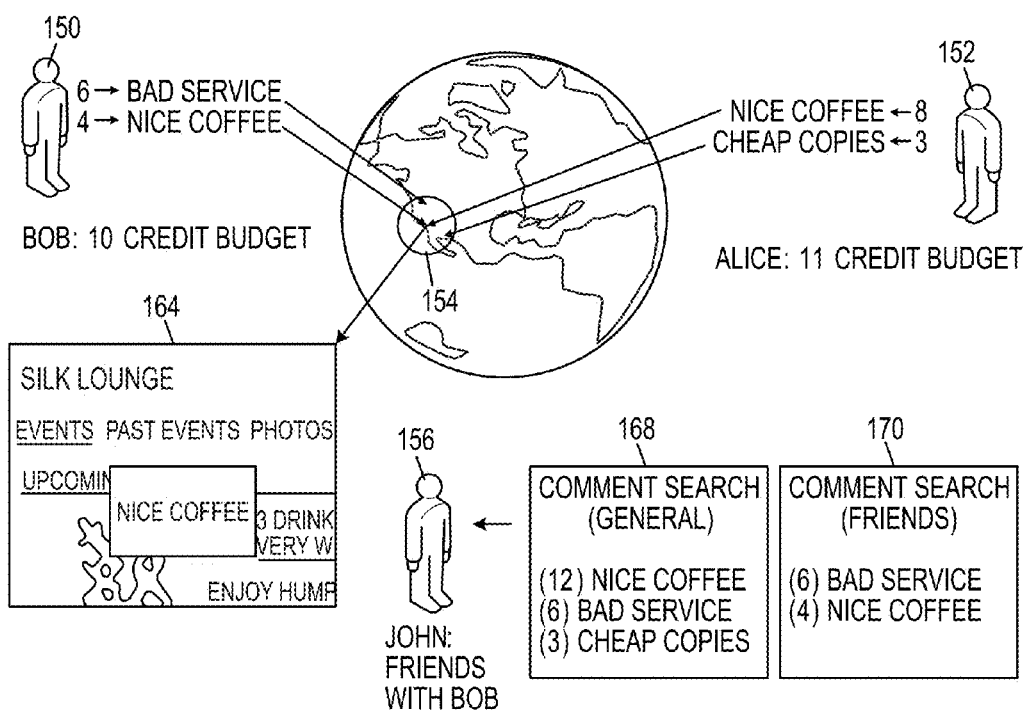
FIG. 10 is a diagrammatic view of an example of an online search based usage model according to the present disclosure.

FIG. 10 is a diagrammatic view of an example of an online search (e.g., MPL search) based usage model in which the first user 150 ("Bob") and the second user 152 ("Alice") both submit comments for MPLs and/or online documents associated with particular businesses that are located within the circular geographic region 154, and the third user 156 ("John") submits requests for identifiers that are associated with recommendations in the geographic region 154. In this example, Bob submits a 6-credit comment for an identifier that is associated with a web page 166 for the "Silk Lounge" and a 4-credit comment for a second identifier. Alice submits an 8-credit comment for the identifier that is associated with the web page 164 for the "Silk Lounge" and a 3-credit comment for a third identifier. John submits two search requests. The first search request is a general search request for all the comments that are associated with the geographic region 154. In response to the first search request, the online search system 16 returns a ranked list 168 of the most popular (i.e., highest aggregated credit score) comments that are associated with the geographic region 154. The second search request is a friends-filtered search request for the comments that are associated with the geographic region 154 and are recommended by John's friends (i.e., Bob). In response to the second search request, the online search system 16 returns a ranked list 170 of the most popular (i.e., highest aggregated credit score) comments that are associated with the geographic region 154 and are recommended by Bob. As shown in FIG. 10, when Bob views the web page 164 that is associated with the "Nice Coffee" comment in a web browser. In addition to viewing the web page 164, Bob also is able to see a graphical representation of the most popular comments that are associated with the web page 164; in this case, the only (hence, most popular) comment is the "Nice Coffee" comment.

The examples that are described herein provide systems and methods of searching for online documents or MPLs based on geography tagged recommendations. These examples enable users to recommend online documents or MPLs to others in connection with respective geographic locations and optionally with respective channels corresponding to categories respectively assigned to the online documents or MPLs. A subscribing user may be presented with ranked list of the most popular online documents or MPLs within a particular geographic location and optionally on a particular channel that is selected by the user.

Other examples are within the scope of the claims.

What is claimed:

1. A system, comprising:
a processor in communication with a memory; and
the memory including a set of instructions executable by the processor to geographically partition a data structure, wherein the geographically partitioned data structure is organized to include information resident in a number of databases geographically-partitioned (geo-partitioned) according to a number of shards, the geographically partitioned data structure including:
a geographically-hashed (geo-hash) look up table containing a number of geo-hash ranges associated with respective database server information, wherein the geo-partitioned databases are partitioned into geographic areas for shards such that search queries limited to a particular geographic location can touch between one to four shards, the geo-hash look up table to receive a function call including a geographic location identifier and a client network node identifier parameter to the function call and link the client network node to a particular server node and an associated geo-partitioned database containing the geo-hash ranges in a shard data object table to perform a query; and
a plurality of user data object tables, each user data object table containing respective user data attributes including a data value representing an amount of user recommendation credit associated with a particular user available for submitting a recommendation, wherein the amount of recommendation credit is decremented after submitting a recommendation, and wherein the respective user data attributes further include user recommendation credit data attributes that include geo-tagged recommendations of online documents or geo-tagged recommendations of mobile print locations received from client network nodes.

2. The system of claim 1, wherein the data structure is organized to enable instructions to execute and access the particular server node and associated geo-partitioned database based on a first three character values of a geo-hash value.

3. The system of claim 1, wherein the data structure is organized to enable instructions to execute and query the geo-hash look up table according to a URL for one of: a popularity ranking, a distance, and a similarity ranking.

4. The system of claim 1, wherein the data structure is organized to enable instructions to execute and link the particular user to the particular server node and the particular geo-partitioned database and index, by URL, a comment from the particular user, regarding a mobile print location (MPL), based on the geographic location identifier, a number of views, a user identifier, a tag identifier, and a referenced URL.

5. The system of claim 1, wherein each shared data object table contains a number of data attributes including:
a shard data attribute;
a user data attribute;
a geographic location data attribute; and
a URL data attribute.

6. A system, comprising:
a processor in communication with a memory; and
the memory including a set of instructions executable by the processor to geographically partition a data structure, wherein the geographically partitioned data structure is organized to include information resident in a number of databases geographically-partitioned (geo-partitioned) according to a number of shards, the geographically partitioned data structure including:
a geographically-hashed (geo-hash) look up table containing a number of geo-hash ranges associated with respective database server information, wherein the geo-partitioned databases are partitioned into geographic areas for shards such that search queries limited to a particular geographic location can touch between one to four shards, the geo-hash look up table linking the client network node to a database server to perform a query, the database server containing the geo-hash ranges in a shard data object table containing a tag attribute, a geographic location attribute, and a title attribute; and
a plurality of user data object tables, each user data object table containing respective user data attributes including a data value representing an amount of user recommendation credit associated with a particular user available for submitting a recommendation, wherein the amount of recommendation credit is decremented after submitting a recommendation, the plurality of user data object tables to link to the database server to perform the query, and wherein the respective user data attributes further include user recommendation credit data attributes that include geo-tagged recommendations of online documents or geo-tagged recommendations of mobile print locations received from client network nodes.

7. The system of claim 6, wherein the shard data object table includes:
a bid data attribute;
a referenced URL data attribute; and
a view attribute.

8. The system of claim 6, wherein the data structure includes:
a note object table logically linked to the particular user;
a reward object table physically linked to the particular user;
a friend object table physically linked to the particular user;
an advertisement object table logically and physically linked to the shard object table;

a URL object table physically linked to the advertisement object table; and an advertisement log object table logically linked to the advertisement object table.

9. The system of claim 6, wherein the user recommendation credit data attributes include mobile print locations received from client network nodes.

\* \* \* \* \*